US010803479B2

(12) United States Patent
Brigham et al.

(10) Patent No.: US 10,803,479 B2
(45) Date of Patent: Oct. 13, 2020

(54) SYSTEMS AND METHODS FOR MANAGEMENT OF AUTOMATED DYNAMIC MESSAGING

(71) Applicant: Conversica, LLC, Foster City, CA (US)

(72) Inventors: Benjamin P. Brigham, Bellingham, WA (US); Macgregor S. Gainor, Bellingham, WA (US); Joseph M. Silverbears, Ferndale, WA (US); Patrick D. Griffin, Bellingham, WA (US); Jared Keller, Bellingham, WA (US)

(73) Assignee: CONVERSICA, INC., Foster City, CA (US)

(*) Notice: Subject to any disclaimer, the term of this patent is extended or adjusted under 35 U.S.C. 154(b) by 438 days.

(21) Appl. No.: 14/604,594

(22) Filed: Jan. 23, 2015

(65) Prior Publication Data

US 2016/0217500 A1    Jul. 28, 2016

(51) Int. Cl.
*G06Q 30/00*    (2012.01)
*G06Q 30/02*    (2012.01)
*G06N 20/00*    (2019.01)

(52) U.S. Cl.
CPC ......... *G06Q 30/0244* (2013.01); *G06N 20/00* (2019.01); *G06Q 30/0276* (2013.01)

(58) Field of Classification Search
CPC .................................................. G06Q 30/0244

(Continued)

(56) References Cited

U.S. PATENT DOCUMENTS 7,076,430 B1 * 7/2006 Cosatto .................. G06T 13/40
                                                         704/272
7,275,083 B1 * 9/2007 Seibel .................... G06Q 30/02
                                                         705/14.39

(Continued)

FOREIGN PATENT DOCUMENTS

EP        3467755 A1 *  4/2019    ......... G06Q 30/0203

OTHER PUBLICATIONS

Quote Wizard & AVA.ai Unveil Automated Virtual Assistant for Insurance Agents Jun. 20, 2014, Insurance Weekly News (Year: 2014).*

(Continued)

*Primary Examiner* — Matthew L Hamilton
(74) *Attorney, Agent, or Firm* — Kang S. Lim

(57) ABSTRACT

Systems and methods for management of automated dynamic messages are providing. In some embodiments, a data store is populated with one or more knowledge sets and one or more lead datasets in response to a user's input. A campaign builder may be provided to the user for generating and initiating campaigns. A campaign is a series of messages designed to satisfy one or more objectives. The campaign builder allows the creation of a campaign by allowing the composition of a series of message templates with variable fields. The variable fields correspond to classes of data from the knowledge sets and/or the lead data. Once the campaign has been initiated, the system categorizes the responses using algorithms. These categorizations have corresponding confidence levels. If the confidence level is too low, manual user intervention may be required in order to determine which subsequent action the system should perform.

20 Claims, 32 Drawing Sheets

(58) Field of Classification Search
USPC .......................................................... 705/14
See application file for complete search history.

(56) References Cited

U.S. PATENT DOCUMENTS

| | | | |
|---|---|---|---|
| 7,512,580 B2 | 3/2009 | Ronnewinkel | |
| 8,099,316 B2 | 1/2012 | Moukas et al. | |
| 8,666,742 B2 | 3/2014 | Detlef et al. | |
| 8,738,739 B2* | 5/2014 | Makar | G06N 20/00 709/219 |
| 8,787,553 B2 | 7/2014 | Fan et al. | |
| 9,552,591 B2* | 1/2017 | Barak | G06Q 30/02 |
| 10,043,205 B2* | 8/2018 | Gupta | G06Q 30/0617 |
| 2007/0036334 A1* | 2/2007 | Culbertson | H04M 3/4938 379/266.01 |
| 2007/0129993 A1* | 6/2007 | Alvin | G06Q 30/02 705/7.32 |
| 2008/0071606 A1* | 3/2008 | Whiteley | G06Q 30/0201 705/7.32 |
| 2009/0048859 A1* | 2/2009 | McCarthy | G06Q 30/02 705/346 |
| 2010/0010885 A1* | 1/2010 | Hill | G06Q 20/30 705/14.15 |
| 2011/0060643 A1* | 3/2011 | Davis | G06Q 30/02 705/14.41 |
| 2012/0245925 A1* | 9/2012 | Guha | G06F 17/27 704/9 |
| 2013/0086188 A1 | 4/2013 | Mays et al. | |
| 2013/0297442 A1* | 11/2013 | Simons | G06Q 50/16 705/26.4 |
| 2014/0122407 A1* | 5/2014 | Duan | G06N 5/02 706/50 |
| 2014/0149161 A1* | 5/2014 | Hedges | G06Q 10/063118 705/7.14 |
| 2014/0195354 A1 | 7/2014 | Pokonosky | |
| 2014/0222854 A1 | 8/2014 | Lee et al. | |
| 2014/0278958 A1 | 9/2014 | Nukala et al. | |
| 2014/0279050 A1* | 9/2014 | Makar | G06N 20/00 705/14.66 |
| 2014/0280184 A1 | 9/2014 | Swaminathan et al. | |
| 2014/0280225 A1 | 9/2014 | Southern-Boukerrou | |
| 2014/0288920 A1 | 9/2014 | Proux | |
| 2015/0100364 A1* | 4/2015 | Friedman | G06Q 10/063118 705/7.17 |
| 2016/0071117 A1* | 3/2016 | Duncan | G06Q 30/0201 705/7.29 |
| 2016/0125364 A1* | 5/2016 | Field | G06Q 10/1097 705/7.21 |

OTHER PUBLICATIONS

Artificial Intelligence-Based Email Conversations Shown to Quadruple Lead Engagement for more Effective Sales and Marketing Campaigns Jun. 5, 2014, NASDAQ OMX's News Release Distribution Channel (Year: 2014).*

Artificial Intelligence Comes to Your Email; Artificial Life Releases New Intelligent Email Module, Mar. 27, 2002, Business Wire (Year: 2002).*

USPTO, ISA/US, "Notification of Transmittal of the ISR and the WO of the International Searching Authority or The Declaration", dated May 6, 2016, 12 pages.

* cited by examiner

Fig. 16

SYSTEMS AND METHODS FOR MANAGEMENT OF AUTOMATED DYNAMIC MESSAGING

CROSS REFERENCE TO RELATED APPLICATIONS

This application is related to an application by Benjamin P. Brigham, entitled "Systems and Methods for Processing Message Exchanges Using Artificial Intelligence", application Ser. No. 14/604,604, filed Jan. 23, 2015, currently pending, which application is incorporated herein in its entirety by this reference.

This application is also related to an application by Benjamin P. Brigham, entitled "Systems and Methods for Configuring Knowledge Sets and AI Algorithms for Automated Message Exchanges", application Ser. No. 14/604,610, filed Jan. 23, 2015, now U.S. Pat. No. 10,206,037, which application is incorporated herein in its entirety by this reference.

BACKGROUND

The present invention relates to systems and methods for the generation, management of a dynamic messaging campaign. Such systems and methods provide marketers and sales people more efficient tools for client management and outreach. In turn, such system and methods enable more productive sales activity, increased profits, and more efficient allocation of sales resources.

Currently sales departments operate passively and actively. Passive sales activity includes providing a general offer for sale of products and/or services to the public and waiting for customers to make the initial contact. Active sales techniques, in contrast, involve the seller reaching out to consumers directly. The benefit of active sales activity is that customers can be targeted more effectively, and purchasing decisions may be more effectively influenced. Active sales techniques may include unsolicited "cold calls", or may include following up with "leads" who have responded to some advertisement, or who has been purchased from a marketing firm. While cold calling has its place, continuing a dialog with an established lead is by far the most targeted and effective means of sales activity.

Active sale techniques have been around for as long as commerce has been occurring. Sellers traditionally hawked their wares via in-person solicitation or fliers. Indeed, to this day, advertisements are routinely sent via postal mail to consumers. When available these mailed advertisements include degrees of customization, such as inclusion of the receivers name printed on the advertisement.

With the advancement of technology, so too have active sales techniques evolved. With the widespread use of telephones telemarketing became a staple of active sales techniques. While this initially took the form of sales people "cold calling" prospective customers, "robocalls" have become more popular recently due to the ability to reach much wider audiences with very little additional resource expenditure.

As the internet has become a more prominent feature of commerce, on-line ads and email campaigns have joined the arsenal of sales departments as ways to engage a potential consumer. Email marketing in particular has become a very effective and frequently utilized means of reaching customers. For large customer populations, these emails are typically minimally tailored advertisements. For smaller customer groups, individual emails may still be crafted by sales associates; however this activity (while more effective) is often very time consuming. Additionally, a sales person can usually only engage in a limited number of these sales correspondences without the use of contact management software.

It is therefore apparent that an urgent need exists for a dynamic messaging system that provides the benefit of an individualized email sales correspondence with the advantages of machine automation. Such dynamic messaging would enable more effective sales activity and marketing campaigns.

SUMMARY

To achieve the foregoing and in accordance with the present invention, systems and methods for management of automated dynamic messages are providing. Such systems and methods enable marketers and salespeople to more efficiently follow up with leads via email (or other textual) exchanges. Using artificial intelligence, the user is required to provide relatively minimal manual intervention until all objectives of the message exchange have been met.

In some embodiments, a data store is populated with one or more knowledge sets and one or more lead datasets in response to a user's input. The lead data includes information collected about the target consumers (or leads), whereas the knowledge sets provide the contextual knowledge required for the artificial intelligence to perform categorization of any incoming responses.

A campaign builder may be provided to the user for generating and initiating campaigns. A campaign is a series of messages designed to satisfy one or more objectives. The information gathered through these message exchanges are referred to as insights. The campaign builder allows the creation of a campaign by allowing the composition of a series of message templates with variable fields. The variable fields correspond to classes of data from the knowledge sets and/or the lead data. These templates may be generated from scratch, or may be imported from existing campaigns (or a template library).

Once the campaign has been initiated, the system categorizes the responses using algorithms. These categorizations have corresponding confidence levels. If the confidence level is too low, manual user intervention may be required in order to determine which subsequent action the system should perform. This may be done via an action interface.

Additionally, in some embodiments, the user may have access to an insight interface (for reviewing and updating insights that have been generated), an AI training tool (for tuning the AI algorithms), a knowledge set interface (for creating or updating knowledge sets), and a statistics interface (for providing the user information regarding the campaign status).

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

In order that the present invention may be more clearly ascertained, some embodiments will now be described, by way of example, with reference to the accompanying drawings, in which:

FIGS. 13-16 are example screenshots of an interface for building a campaign, in accordance with some embodiment;

DETAILED DESCRIPTION

Figure 1:
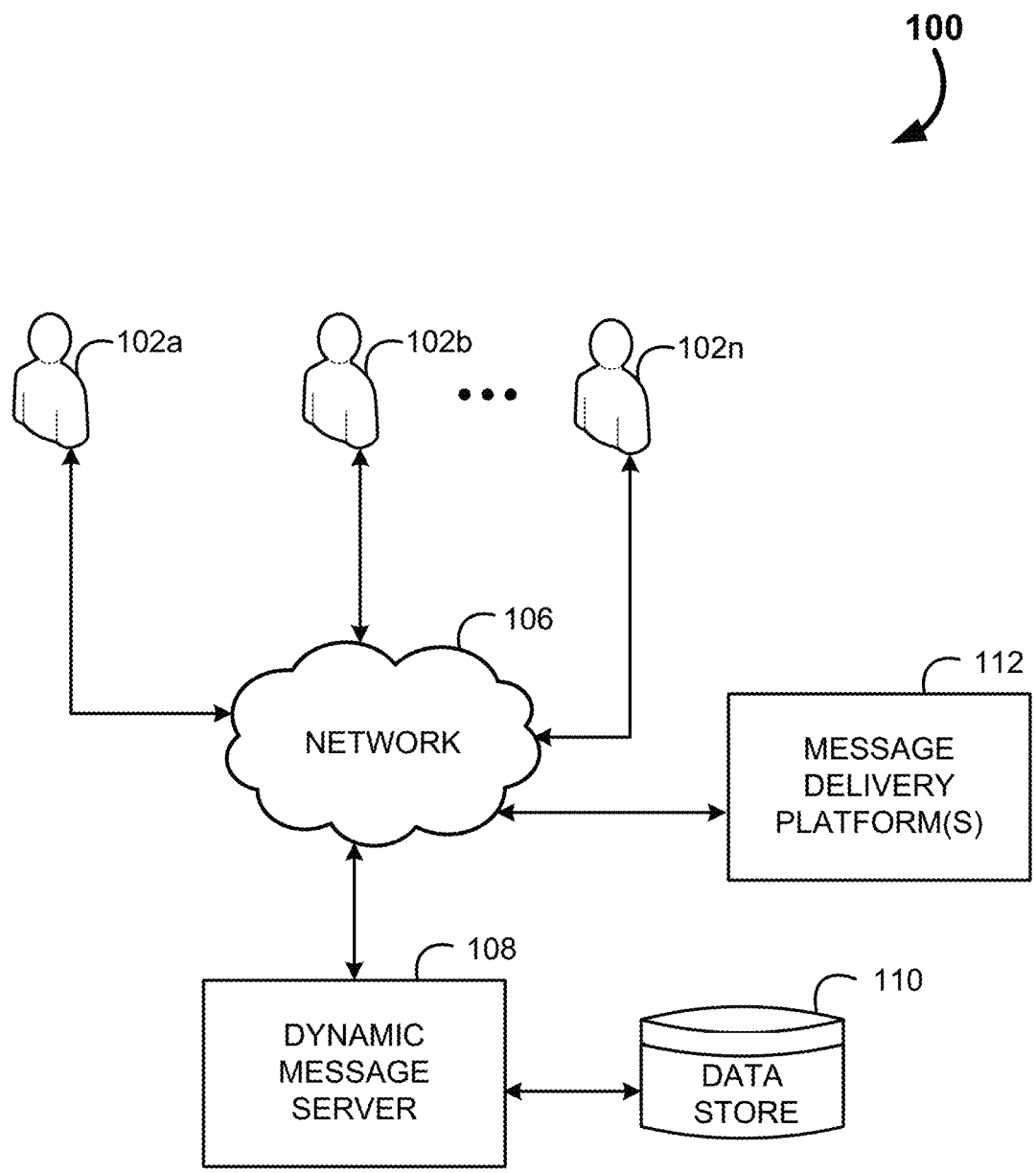
FIG. 1 is an example logical diagram of a system for generation and implementation of messaging campaigns, in accordance with some embodiment.

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

Aspects, features and advantages of exemplary embodiments of the present invention will become better understood with regard to the following description in connection with the accompanying drawing(s). It should be apparent, to those skilled in the art, that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute and/or sequential terms, such as, for example, "will," "will not," "shall," "shall not," "must," "must not," "first," "initially," "next," "subsequently," "before," "after," "lastly," and "finally," are not meant to limit the scope of the present invention as the embodiments disclosed herein are merely exemplary.

Note that the term "user" is utilized to describe the user of a device who is generating and managing a messaging campaign. It is likewise understood that the terms "participant", "sales associate", and "salesperson" are likewise often utilized interchangeably with the term "user".

Likewise, the term "recipient" is utilized to refer to the person(s) receiving the generated messages. Other terms such as "consumer" and "lead" may be interchangeably used.

Lastly, the following discussions and accompanying examples are directed toward the utilization of the messaging system in the context of sales activities, primarily with developing sales leads. Sales activities are a natural use case for the presently disclosed systems and methods; however, the messaging systems described herein are not limited to sales activities. Indeed, the presently disclosed systems and methods can be employed in a variety of contexts and situations. For example, the disclosed messaging systems may be useful in customer support settings, educational campaigns, fundraising, or any other situation where a large number of messages within a defined context are needed.

The following disclosure includes a series of subsections. These subsections are not intended to limit the scope of the disclosure in any way, and are merely for the sake of clarity and ease of reading. As such, disclosure in one section may be equally applied to processes or descriptions of another section if and where applicable.

I. DEFINITIONS

The following systems and methods for dynamic messaging a campaign relies upon an interplay of user interaction, and sophisticates artificial intelligence (AI) processing of received messages. The goal of the message campaign it to enable a logical dialog exchange with a recipient, where the recipient is not necessarily aware that they are communicating with an automated machine as opposed to a human user. This may be most efficiently performed via a written dialog, such as email, text messaging, chat, etc. However, it is entirely possible that given advancement in audio and video processing, it may be entirely possible to have the dialog include audio or video components as well.

In order to effectuate such an exchange, an AI system is employed within an AI platform within the messaging system to process the responses and generate conclusions regarding the exchange. These conclusions include calculating the context of a document, insights, sentiment and confidence for the conclusions. Given that these terms are not readily familiar outside of the field of natural language processing, a series of definitions are provided in order to clarify the terminology:

accuracy—the calculated probability that a classification determined by the AI is correct.

(AI) algorithm—a method employed to calculate the weight of a document in a particular category.

aspect—a specific AI algorithm. Example: NaiveBayes, Sentiment.

attempt—a single message in a series for a campaign.

AI Trainer—term for the tool used to classify a document that the aspects were not confident scoring.

campaign—a set of possible messaging designed to be sent out to a lead over the course of a conversation depending on the receipt and classification of responses (or lack thereof).

categorization—the process in which ideas and objects are recognized, differentiated, and understood, generally into categories.

category—possible answers to the insight they belong to. Example: Insight: "Continue messaging?" has categories: "Stop" and "Continue".

classification—another word for categorization.

confidence—a calculated probability that the categorization is correct.

context—a collection of documents that have some commonality. Example: "all documents collected from asking 'What is a good phone number?'.", "messages sent from customers in a chat with Bill in customer service".

document—a set of words in a specific order used to convey a meaning.

Hardrule—an AI algorithm that dictates a category based off a single token. These tokens are found to occur overwhelmingly within those specific categories.

hardrule term—a token that is used by the Hardrule aspect.

insight—a collection of categories used to answer some question about a document. Example: "What does this person mean?", "How does this person feel?", "Should we keep emailing this person?"

knowledge set—a set of tokens with their associated category weights used by an aspect during classification.

lead—a person who is placed into the system at a certain time under a certain campaign.

lead (event) history—the notable information for a lead coming into the system, messages sent to that lead, responses received and alerts sent out, in the chronological order of their occurrences.

ngram—denotes the number of words used to make a token. Example: token "yes it is" is a tri-gram or an ngram of 3.

normalization—removing characters/tokens in order to reduce the complexity of the document without changing the accuracy of classifications.

question—an inquiry included in a message designed to limit the response to a subset of the target language.

response—the document received after sending a message to a lead.

(response) actions—tasks that the system can carry out for a given lead based on the classification of the response.

Sentiment—an AI algorithm that is used to gauge how strongly a category expresses itself in a document.

series—a subset of a campaign designed to be sent out until a response is received for that subset of messages. Based on the classification of the response, the system may continue to another series of messaging in that same campaign.

score—a set of classifications made by the different aspects for different insights.

The (AI) Platform—the system that allows interaction with, setup, score, and modify the AI algorithms as need be. This also includes the code, databases and servers used for this specific purpose.

token—one or more words used as a single unit to correlate to a category through assigning a weight.

training set—a set of classified documents used to calculate knowledge sets.

weight—the numeric value assigned to a token or document for a category based on the training for a particular algorithm.

word—a combination of characters used to denote meaning in a language.

variabilization—grouping a word or set of words into a single token. Example: "Alex", "Sarah", and "Jill" can all be variabilized into the token "_name_".

II. DYNAMIC MESSAGING SYSTEMS

To facilitate the discussion, FIG. 1 is an example logical diagram of a system for generating and implementing messaging campaigns, shown generally at 100. In this example block diagram, a number of users 102*a-n* are illustrated engaging a dynamic messaging system 108 via a network 106. Note that messaging campaigns may be uniquely customized by each user 102*a-n* in some embodiments. In alternate embodiments, users may be part of collaborative sales departments (or other collaborative group) and may all have common access to the messaging campaigns. The users 102*a-n* may access the network from any number of suitable devices, such as laptop and desktop computers, work stations, mobile devices, media centers, etc.

The network 106 most typically includes the internet, but may also include other networks such as a corporate WAN, cellular network, corporate local area network, or combination thereof, for example. The messaging server 108 may distribute the generated messages to the various message delivery platforms 112 for delivery to the individual recipients. The message delivery platforms 112 may include any suitable messaging platform. Much of the present disclosure will focus on email messaging, and in such embodiments the message delivery platforms 112 may include email servers (gmail, yahoo, hotmail, etc.). However, it should be realized that the presently disclosed systems for messaging are not necessarily limited to email messaging. Indeed, any messaging type is possible under some embodiments of the present messaging system. Thus, the message delivery platforms 112 could easily include a social network interface, instant messaging system, text messaging (SMS) platforms, or even audio telecommunications systems. While audio is possible with the given messaging system, it is often desirable for the recipient to have a seamless experience where the automated messages are virtually indistinguishable from messages authored by a sales associate. Due to inherent difficulties in generating realistically human sounding automated audio (much less imitating a specific sales associate), much of the present disclosure will focus on the generation of written textual messages.

One or more data sources 110 may be available to the messaging server 108 in order to provide user specific information, message template data, knowledge sets, insights, and lead information. These information types will be described in greater detail below.

Figure 2:
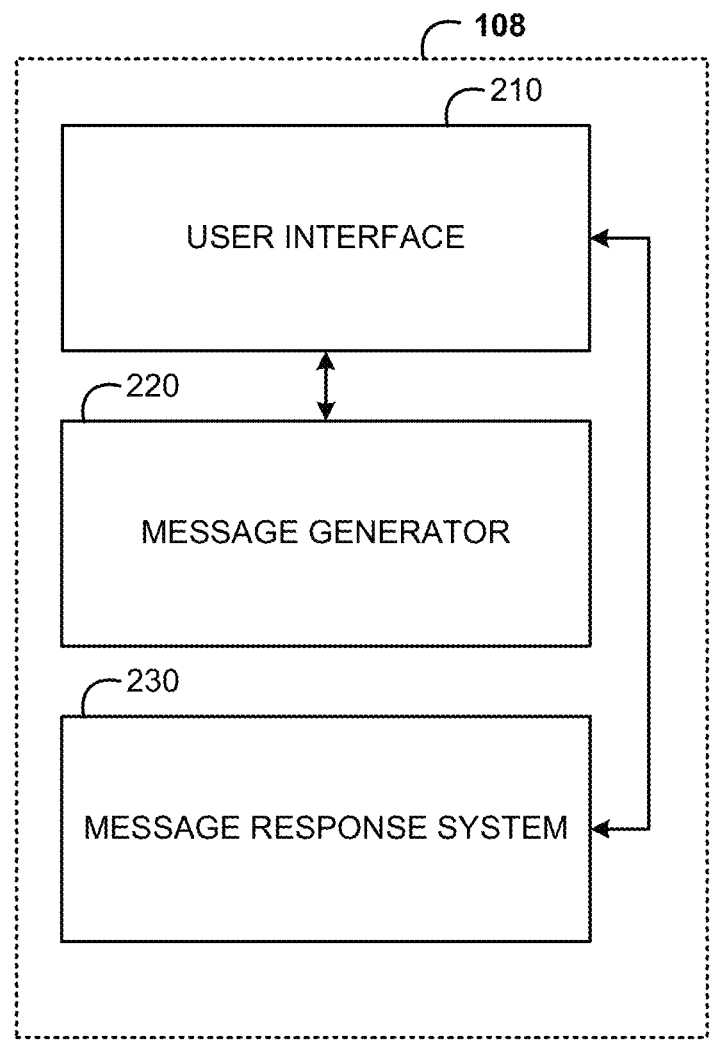
FIG. 2 is an example logical diagram of a dynamic messaging server, in accordance with some embodiment.

Moving on, FIG. 2 provides a more detailed view of the dynamic messaging server 108, in accordance with some embodiment. The server is comprised of three main logical subsystems: a user interface 210, a message generator 220, and a message response system 230. The user interface 210 may be utilized to access the message generator 220 and the message response system 230 in order to set up messaging campaigns, and manage those campaigns throughout their life cycle. At a minimum, the user interface 210 includes APIs to allow a users device to access these subsystems. Alternatively, the user interface 210 may include web accessible messaging creation and management tools, as will be explored below in some of the accompanying example screenshots.

Figure 3:
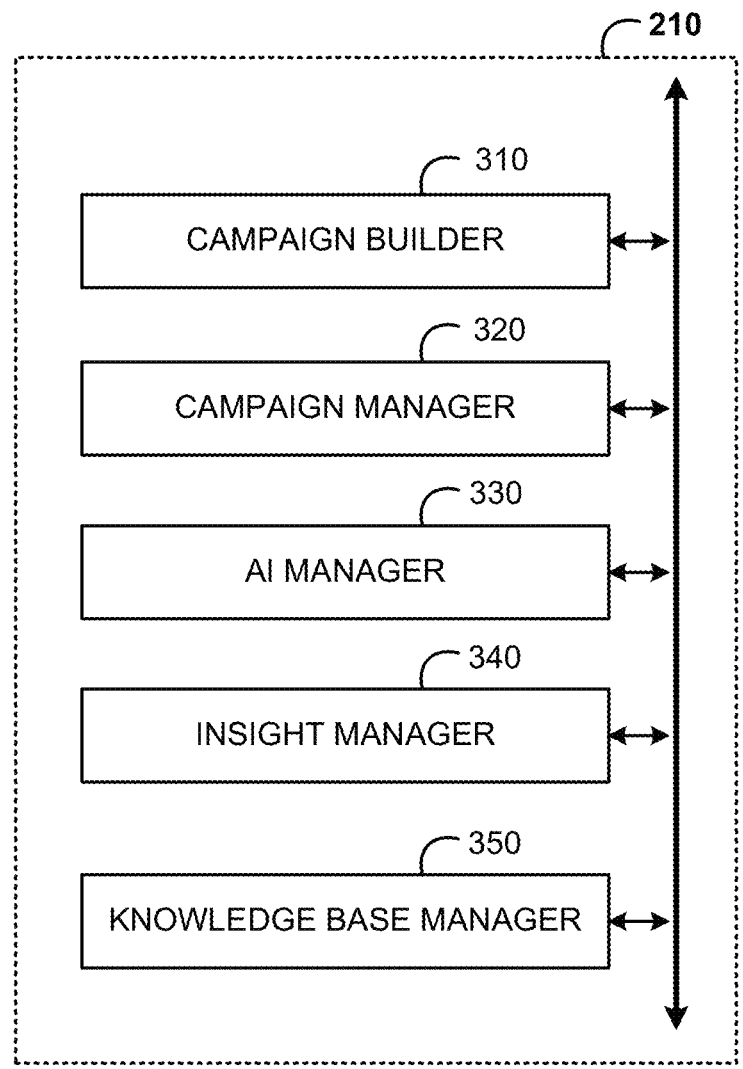
FIG. 3 is an example logical diagram of a user interface within the dynamic messaging server, in accordance with some embodiment.

FIG. 3 provides a more detailed illustration of the user interface 210. The user interface 210 includes a series of modules in order to enable the previously mentioned functions to be carried out in the message generator 220 and the message response system 230. These modules include a campaign builder 310, a campaign manager 320 an AI manager 330, an insight manager 340, and a knowledge base manager 350.

The campaign builder 310 allows the user to define a campaign, and input message templates for each series within the campaign. A knowledge set and lead data may be associated with the campaign in order to allow the system to automatically effectuate the campaign once built. Lead data includes all the information collected on the intended recipients, and the knowledge set includes a database from which the AI can infer context and perform classifications on the responses received from the recipients.

The campaign manager 320 provides activity information, status, and logs of the campaign once it has been implemented. This allows the user 102a to keep track of the campaigns progress, success and allows the user to manually intercede if required. The campaign may likewise be edited or otherwise altered using the campaign manager 320.

The AI manager 330 allows the user to access the training of the artificial intelligence which analyzes responses received from a recipient. One purpose of the given systems and methods is to allow very high throughput of message exchanges with the recipient with relatively minimal user input. In order to perform this correctly, natural language processing by the AI is required, and the AI must be correctly trained in order to make the appropriate inferences and classifications of the response message. The user may leverage the AI manager 330 to review documents the AI has processed and has made classifications for.

The insight manager 340 allows the user to manage insights. As previously discussed, insights are a collection of categories used to answer some question about a document. For example, a question for the document could include "is the lead looking to purchase a car in the next month?" Answering this question can have direct and significant importance to a car dealership. Certain categories that the AI system generates may be relevant toward the determination of this question. These categories are the 'insight' to the question, and may be edited or newly created via the insight manager 340.

In a similar manner, the knowledge base manager 350 enables the management of knowledge sets by the user. As discussed, a knowledge set is set of tokens with their associated category weights used by an aspect (AI algorithm) during classification. For example, a category may include "continue contact?", and associated knowledge set tokens could include statements such as "stop", "do no contact", "please respond" and the like. The knowledge base manager 350 enables the user to build new knowledge sets, or edit exiting ones.

Figure 4:
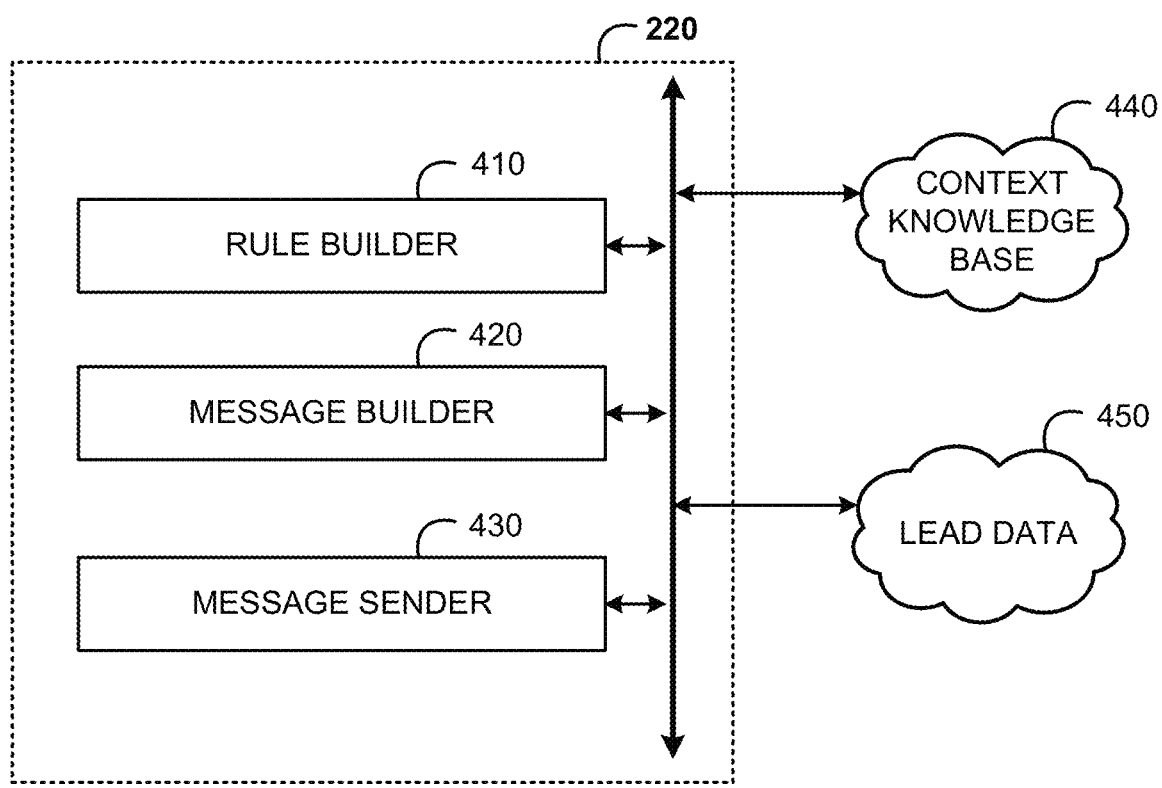
FIG. 4 is an example logical diagram of a message generator within the dynamic messaging server, in accordance with some embodiment.

Moving on to FIG. 4, an example logical diagram of the message generator 220 is provided. The message generator 220 utilizes context knowledge 440 and lead data 450 in order to generate the initial message. The message generator 220 includes a rule builder 410 which allows the user to define rules for the messages. A rule creation interface which allows users to define a variable to check in a situation and then alter the data in a specific way. For example, when receiving the scores from the AI, if the insight is Interpretation and the chosen category is 'good', then have the Continue Messaging insight return 'continue'.

The rule builder 410 may provide possible phrases for the message based upon available lead data. The message builder 420 incorporates those possible phrases into a message template, where variables are designated, in order to generate the outgoing message. This is provided to the message sender 430 which formats the outgoing message and provides it to the messaging platforms for delivery to the appropriate recipient.

Figure 5:
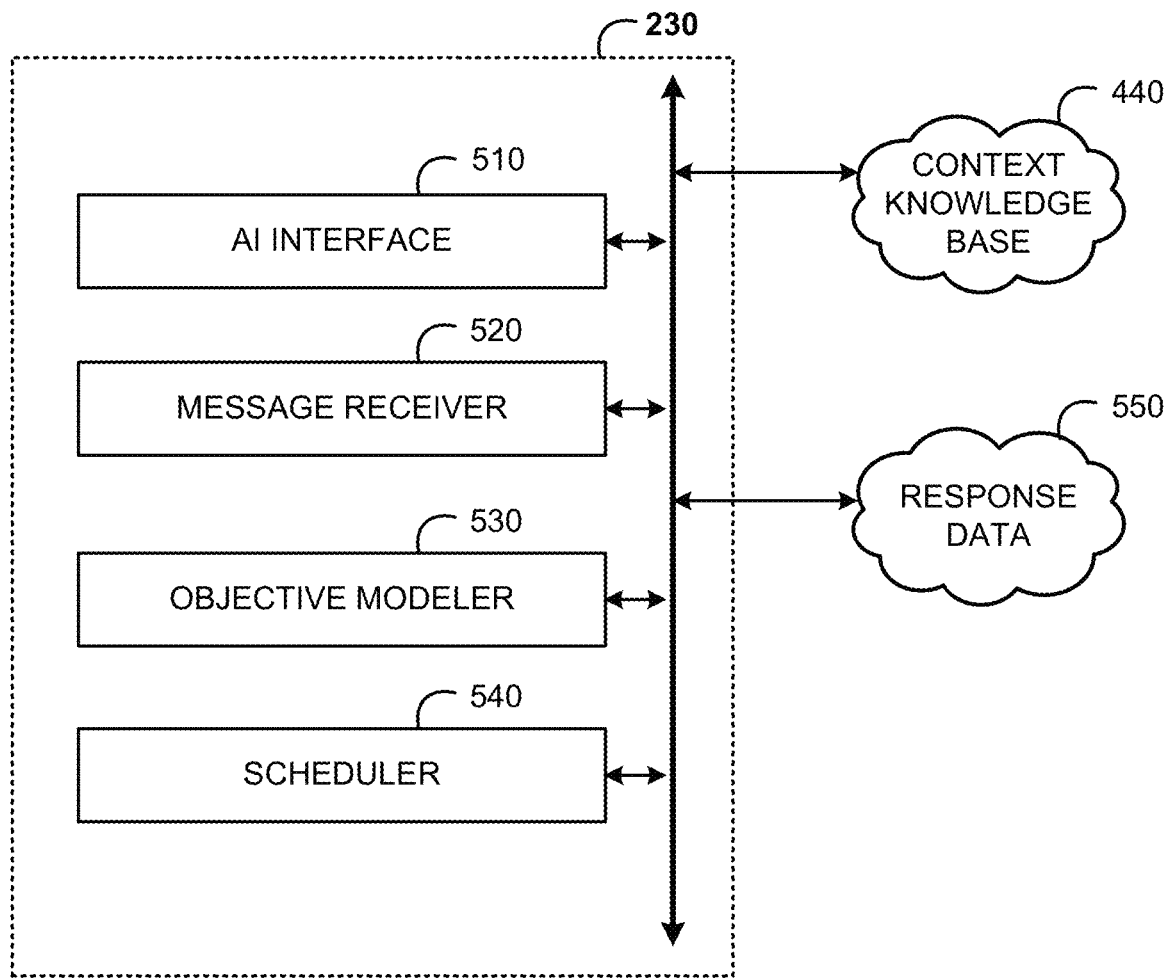
FIG. 5 is an example logical diagram of a message response system within the dynamic messaging server, in accordance with some embodiment.

FIG. 5 is an example logical diagram of the message response system 230. In this example system, the contextual knowledge base 440 is utilized in combination with response data 550 received from the lead. The message receiver 520 receives the response data 550 and provides it to the AI interface and objective modeler 530 for feedback. The AI interface 510 allows the AI platform to process the response for context, insights, sentiments and associated confidence scores. Based on the classifications generated by the AI lead objectives may be updated by the objective modeler 530.

The message receiver 520 can then determine whether there are further objectives that are still pending, or whether there has been a request to discontinue messaging the lead. If there has been a termination request, or if all objectives have been fulfilled, the message receiver may deactivate the campaign for the given lead. If not, a scheduler 540 may be employed to assist in scheduling the next step of the campaign.

III. METHODS OF MESSAGING

Figure 6:
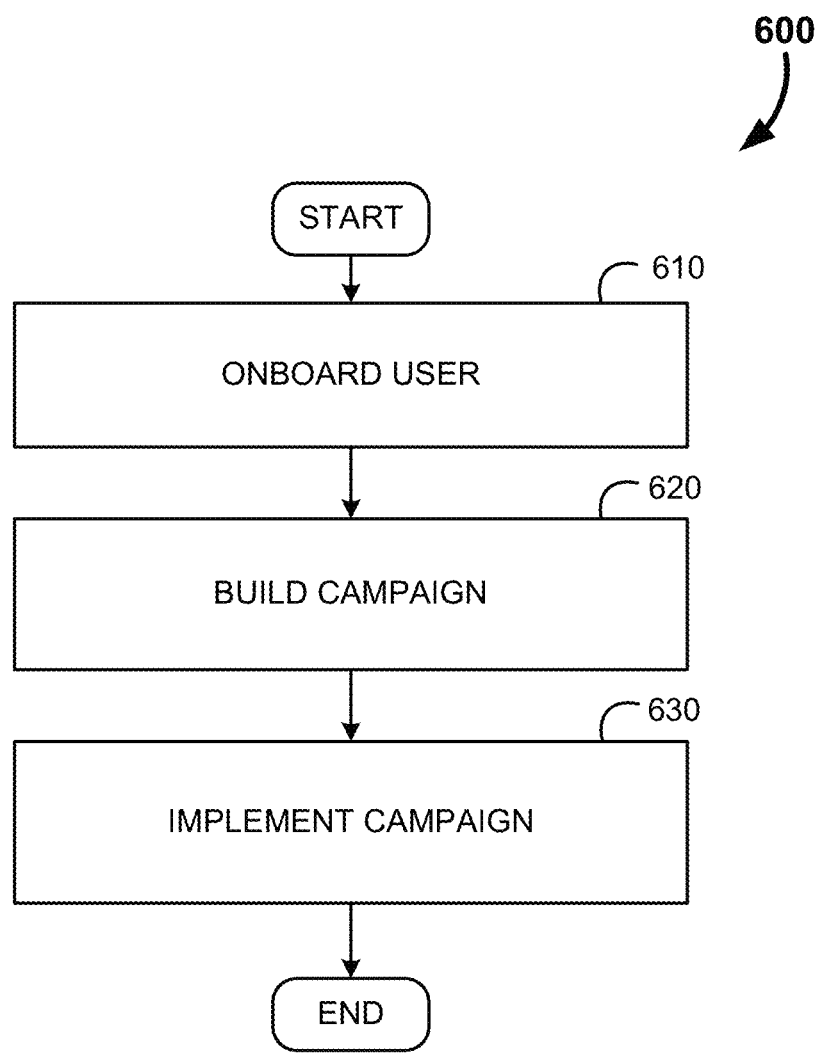
FIG. 6 is an example flow diagram for a dynamic message campaign, in accordance with some embodiment.

Now that the systems for dynamic messaging campaigns have been broadly described, attention will be turned to processes employed to generate and present the customized media. In FIG. 6 an example flow diagram for a dynamic message campaign is provided, shown generally at 600. The process can be broadly broken down into three portions: the on-boarding of a user (at 610), campaign generation (at 620) and campaign implementation (at 630). The following figures and associated disclosure will delve deeper into the specifics of these given process steps.

Figure 7:
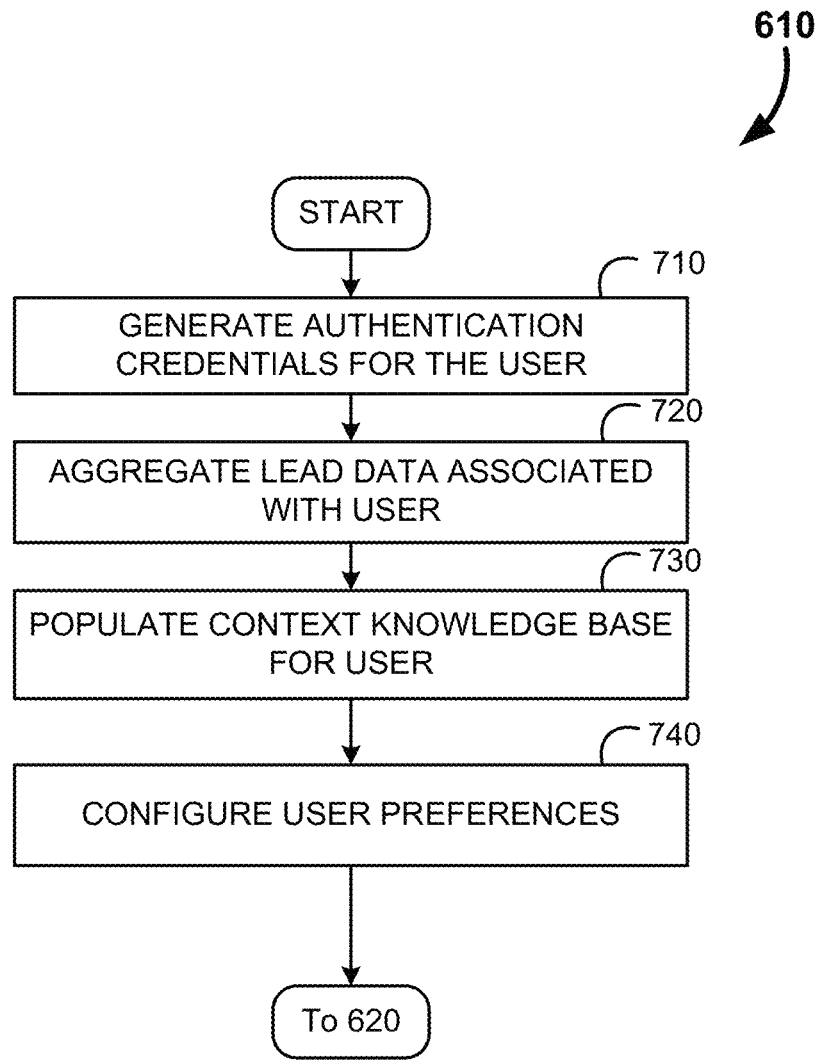
FIG. 7 is an example flow diagram for the process of on-boarding a user, in accordance with some embodiment.

FIG. 7, for example, provides a more detailed look into the on-boarding process, shown generally at 610. Initially a user is provided (or generates) a set of authentication credentials (at 710). This enables subsequent authentication of the user by any known methods of authentication. This may include username and password combinations, biometric identification, device credentials, etc.

Next, the lead data associated with the user is imported, or otherwise aggregated, to provide the system with a lead database for message generation (at 720). Likewise, context knowledge data may be populated as it pertains to the user (at 730). Often there are general knowledge data sets that can be automatically associated with a new user; however, it is sometimes desirable to have knowledge sets that are unique to the user's campaign that wouldn't be commonly applied. These more specialized knowledge sets may be imported or added by the user directly.

Lastly, the user is able to configure their preferences and settings (at 740). This may be as simple as selecting dashboard layouts, to configuring confidence thresholds required before alerting the user for manual intervention.

Figure 8:
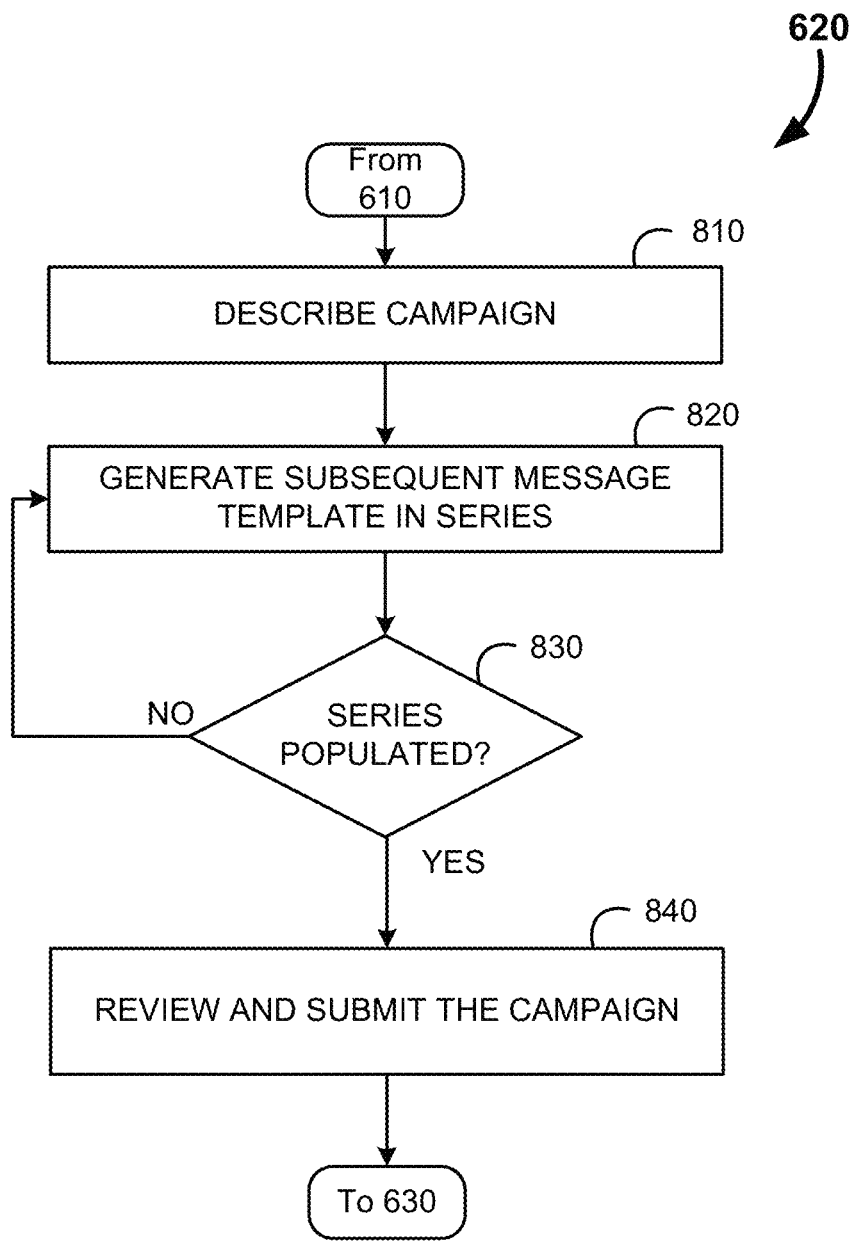
FIG. 8 is an example flow diagram for the process of building a campaign, in accordance with some embodiment.

Moving on, FIG. 8 is the example flow diagram for the process of building a campaign, shown generally at 620. The user initiates the new campaign by first describing the campaign (at 810). Campaign description includes providing a campaign name, description, industry selection, and service type. The industry selection and service type may be utilized to ensure the proper knowledge sets are relied upon for the analysis of responses.

Figure 9:
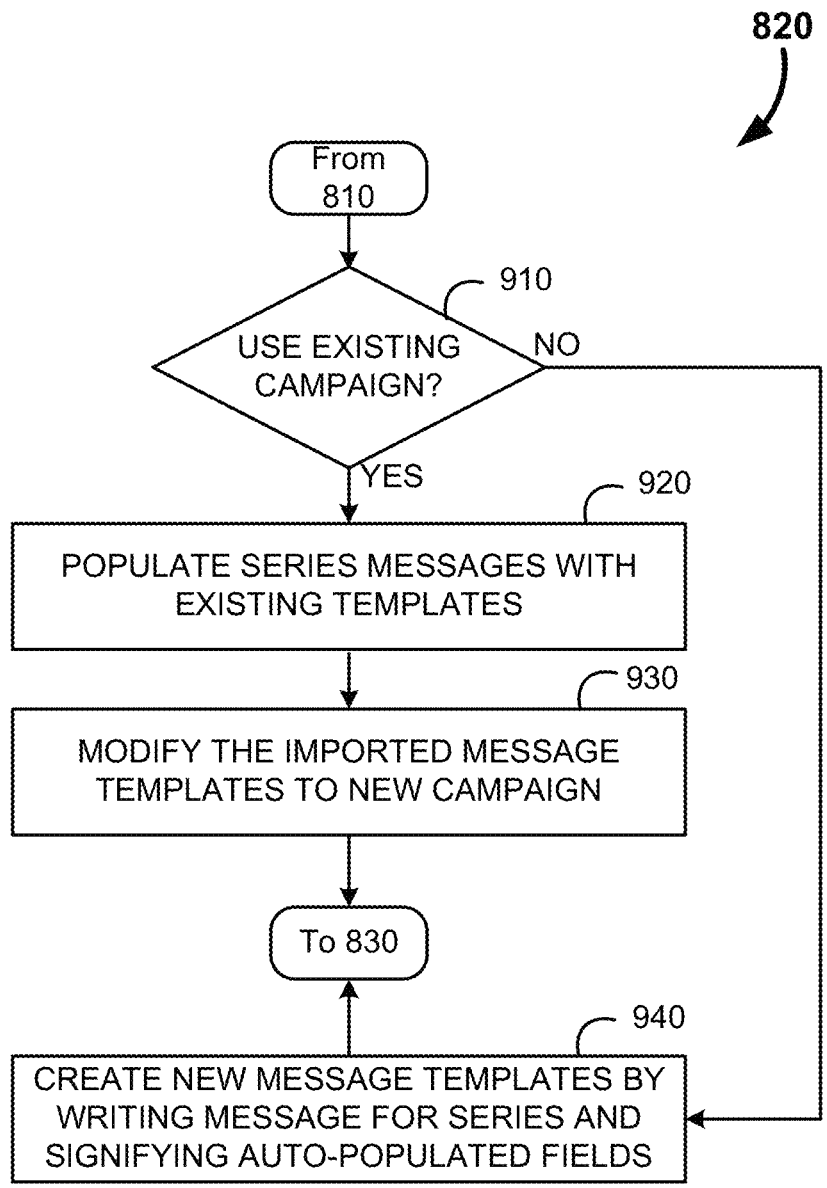
FIG. 9 is an example flow diagram for the process of generating message templates, in accordance with some embodiment.

After the campaign is described, the message templates in the campaign are generated (at 820). If the series is populated (at 830), then the campaign is reviewed and submitted (at 840). Otherwise, the next message in the template is generated (at 820). FIG. 9 provides greater details of an example of this sub-process for generating message templates. Initially the user is queried if an existing campaign can be leveraged for templates, or whether a new template is desired (at 910).

If an existing campaign is used, the new message templates are generated by populating the templates with existing templates (at 920). The user is then afforded the opportunity to modify the message templates to better reflect the new campaign (at 930). Since the objectives of many campaigns may be similar, the user will tend to generate a library of campaign that may be reused, with or without modification, in some situations. Reusing campaigns has time saving advantages, when it is possible.

However, if there is no suitable campaign to be leveraged, the user may instead opt to write the message templates from scratch (at 940). When a message template is generated, the bulk of the message is written by the user, and variables are imported for regions of the message that will vary based upon the lead data. Successful messages are designed to elicit responses that are readily classified. Higher classification accuracy enables the system to operate longer without user interference, which increases campaign efficiency and user workload.

Figure 10:
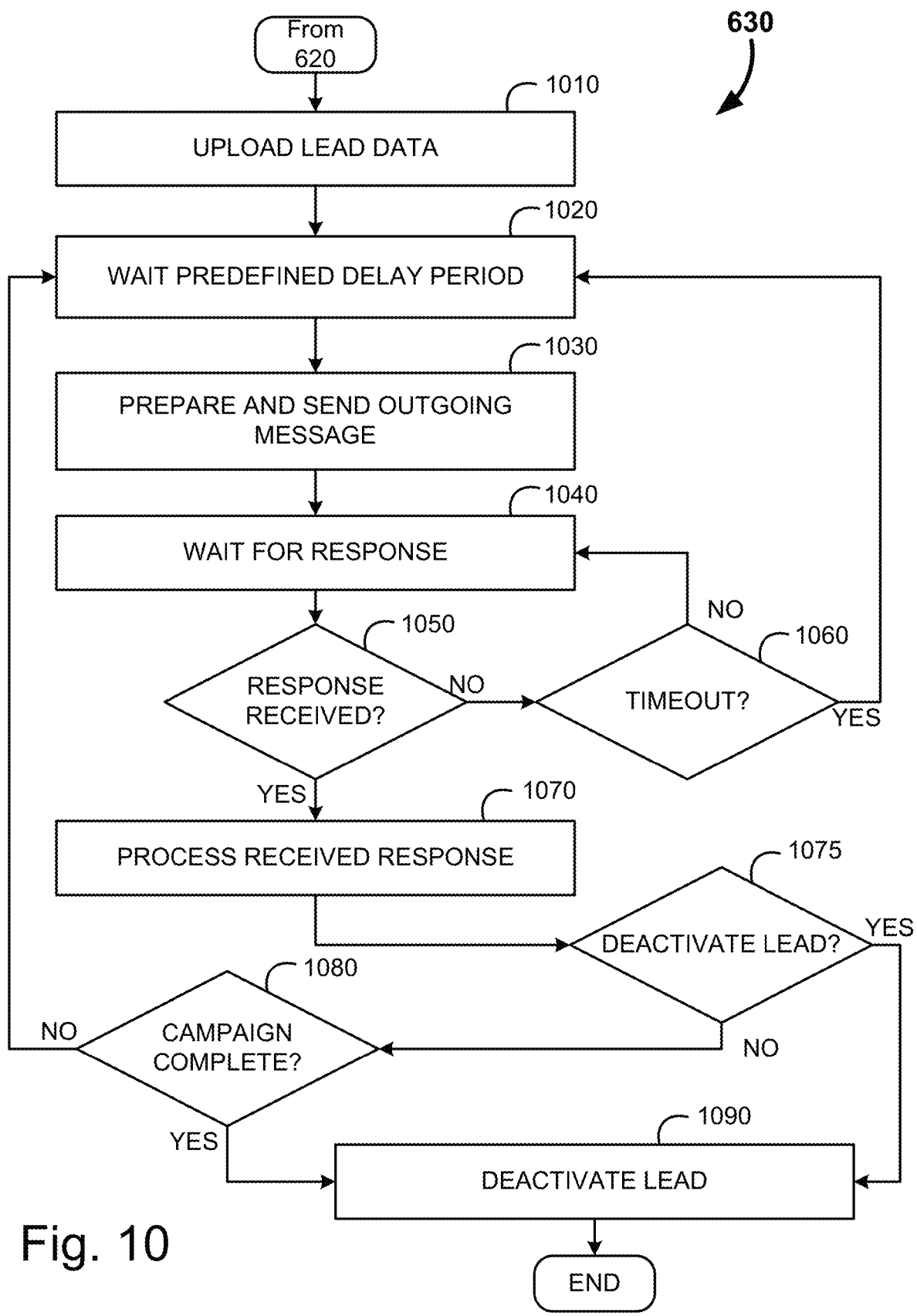
FIG. 10 is an example flow diagram for the process of implementing the campaign, in accordance with some embodiment.

Once the campaign has been built out it is ready for implementation. FIG. 10 is an example flow diagram for the process of implementing the campaign, shown generally at 630. Here the lead data is uploaded (at 1010). Lead data may include any number of data types, but commonly includes lead names, contact information, date of contact, item the lead was interested in, etc. Other data can include open comments that leads supplied to the lead provider, any items the lead may have to trade in, and the date the lead came into the lead provider's system. Often lead data is specific to the industry, and individual users may have unique data that may be employed.

An appropriate delay period is allowed to elapse (at 1020) before the message is prepared and sent out (at 1030). The waiting period is important so that the lead does not feel overly pressured, nor the user appears overly eager. Additionally, this delay more accurately mimics a human correspondence (rather than an instantaneous automated message).

Figure 11:
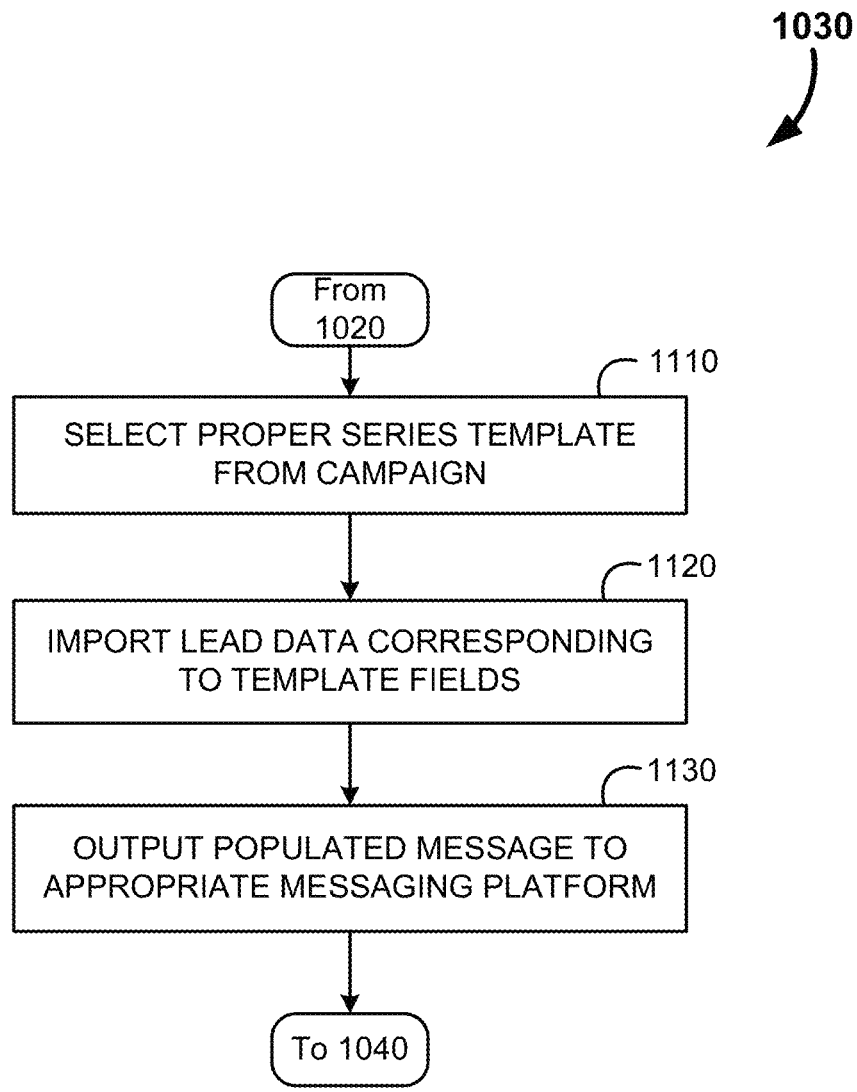
FIG. 11 is an example flow diagram for the process of preparing and sending the outgoing message, in accordance with some embodiment.

FIG. 11 provides a more detailed example of the message preparation and output. In this example flow diagram, the message within the series is selected based upon which objectives are outstanding (at 1110). Typically, the messages will be presented in a set order; however, if the objective for a particular lead has already been met for a given series, then another message may be more appropriate. Likewise, if the recipient didn't respond as expected, or not at all, it may be desirous to have alternate message templates in order to address the lead most effectively.

After the message template is selected from the series, the lead data is parsed through, and matches for the variable fields in the message templates are populated (at 1120). The populated message is output to the appropriate messaging platform (at 1130), which as previously discussed typically includes an email service, but may also include SMS services, instant messages, social networks, or the like.

Returning to FIG. 10, after the message has been output, the process waits for a response (at 1040). If a response is not received (at 1050) the process determines if the wait has been timed out (at 1060). Allowing a lead to languish too long may result in missed opportunities; however, pestering the lead to frequently may have an adverse impact on the relationship. As such, this timeout period may be user defined. Often the timeout period varies from a few days to a week or more. If there has not been a timeout event, then the system continues to wait for a response (at 1050). However, once sufficient time has passed without a response, it may be desirous to return to the delay period (at 1020) and send a follow-up message (at 1030). Often there will be available reminder templates designed for just such a circumstance.

Figure 12:
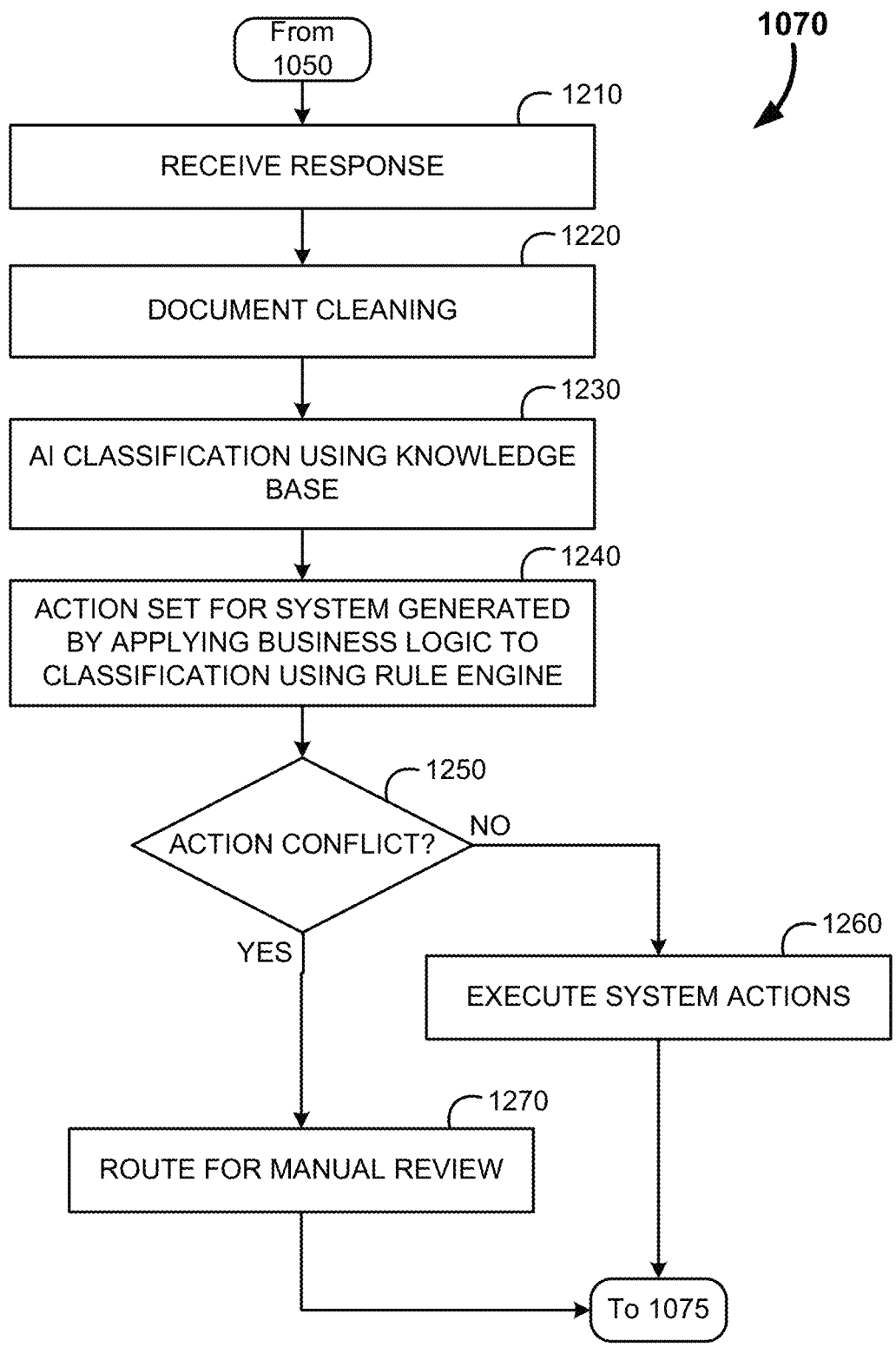
FIG. 12 is an example flow diagram for the process of processing received responses, in accordance with some embodiment.

However, if a response is received, the process may continue with the response being processed (at 1070). This processing of the response is described in further detail in relation to FIG. 12. In this sub-process, the response is initially received (at 1210) and the document may be cleaned (at 1220). Document cleaning may include a normalization process where characters and tokens are removed in order to reduce the complexity of the document without changing the intended classification. Document cleaning has a number of steps to it. Upon initial receipt of the response, often a number of elements need to be removed, including the original message, HTML encoding for HTML style responses, enforce UTF-8 encoding so as to get diacritics and other notation from other languages, and signatures so as to not confuse the AI. Only after all this removal process does the normalization process occur, which includes variabilization, removing stopwords, manual replacements, spelling corrections, and removal of punctuation, numbers, and any other tokens that are deemed unnecessary.

The normalized document is then provided to the AI platform for classification using the knowledge sets (at 1230). As previously mentioned, there are a number of known algorithms that may be employed in order to categorize a given document, including Hardrule, NaiveBayes, Sentiment, neural nets, k-nearest neighbor, other vector based algorithms, etc. to name a few. In some embodiments, multiple algorithms may be employed simultaneously, and then a combination of the algorithm results are used to make the classification. The algorithm(s) selected may be those with the highest confidence level in their classification, or those who agree most closely to one another. Responses to informational messages may be classified differently than responses to questions. Classification depends on the type of responses received by each outgoing messages. The classifications may be combined with business logic within the objective model rule engine in order to generate an action set (at 1240). Campaign objectives, as they are updated, may be used to redefine the actions collected and scheduled. For example, 'skip-to-followup' action may be replaced with an informational message introducing the sales rep before proceeding to 'series 3' objectives. Additionally, 'Do Not Email' or 'Stop Messaging' classifications should deactivate a lead and remove scheduling at any time during a lead's life-cycle.

After the actions are set, a determination is made whether there is an action conflict (at 1250). Manual review may be needed when such a conflict exists (at 1270). Otherwise, the actions may be executed by the system (at 1260).

Returning to FIG. 10, after the response has been processed, a determination is made whether to deactivate the lead (at 1075). Such a deactivation may be determined as needed when the lead requests it. If so, then the lead is deactivated (at 1090). If not, the process continues by determining if the campaign for the given lead is complete (at 1080). The campaign may be completed when all objectives for the lead have been met, or when there are no longer messages in the series that are applicable to the given lead. Once the campaign is completed, the lead may likewise be deactivated (at 1090).

However, if the campaign is not yet complete, the process may return to the delay period (at 1020) before preparing and sending out the next message in the series (at 1030). The process iterates in this manner until the lead requests deactivation, or until all objectives are met.

IV. EXAMPLES

The following examples include example screenshots of interfaces for building and managing messaging campaigns. It should be noted that while considerable numbers of example screenshots are provided for this sales driven example, the disclosed systems and methods for dynamic messaging are applicable for many purposes beyond sales and marketing. For example, educators could benefit greatly from such messaging capabilities. Furthermore, customer service, help-lines, and information services could benefit greatly from the disclosed systems and methods of messaging campaigns.

Moreover, the following examples also focus heavily upon email messaging. While email messaging may be particularly effective as a communication tool, it is entirely possible that the messages being generated may include audio, video and animations, text messages, Instant messages, forum postings, messaging within a social media platform, or any combination thereof. As such, it is of paramount importance that the following examples provide clarity of the messaging campaign systems and methods without unduly limiting their scope.

Figure 13:
Figure 14:

FIGS. 13-16 are example screenshots of an interface for building a campaign, in accordance with some embodiment. In FIG. 13, shown generally at 1300, the user is presented a listing of existing campaigns, and the ability to create a new campaign. If selected, the user is redirected to the screen shown at FIG. 14. Here, shown generally at 1400, the user is asked to name the campaign, have a dashboard identifier for the campaign, and input a description for the campaign. As previously noted, the presently disclosed systems and methods allow a user to have a very large number of campaigns going on simultaneously. The description ensures that the user is able to keep the various campaigns organized and clear.

In addition to providing designations and descriptions for the campaign, the user is likewise allowed to select the industry and service type for the given campaign. These selections enable the proper knowledge sets to be associated with the campaign so that the AI can more accurately classify any responses. They are also used to tie into Salesforce and into billing of the messaging service so the customer can be accurately charged for the campaigns they are running.

Figure 15:

At FIG. 15, the next step in campaign generation is message template formation. This can be done from scratch, or an existing campaign may be leveraged for the generation of these messages. This screenshot 1500 provides the options presented to the user.

Figure 16:
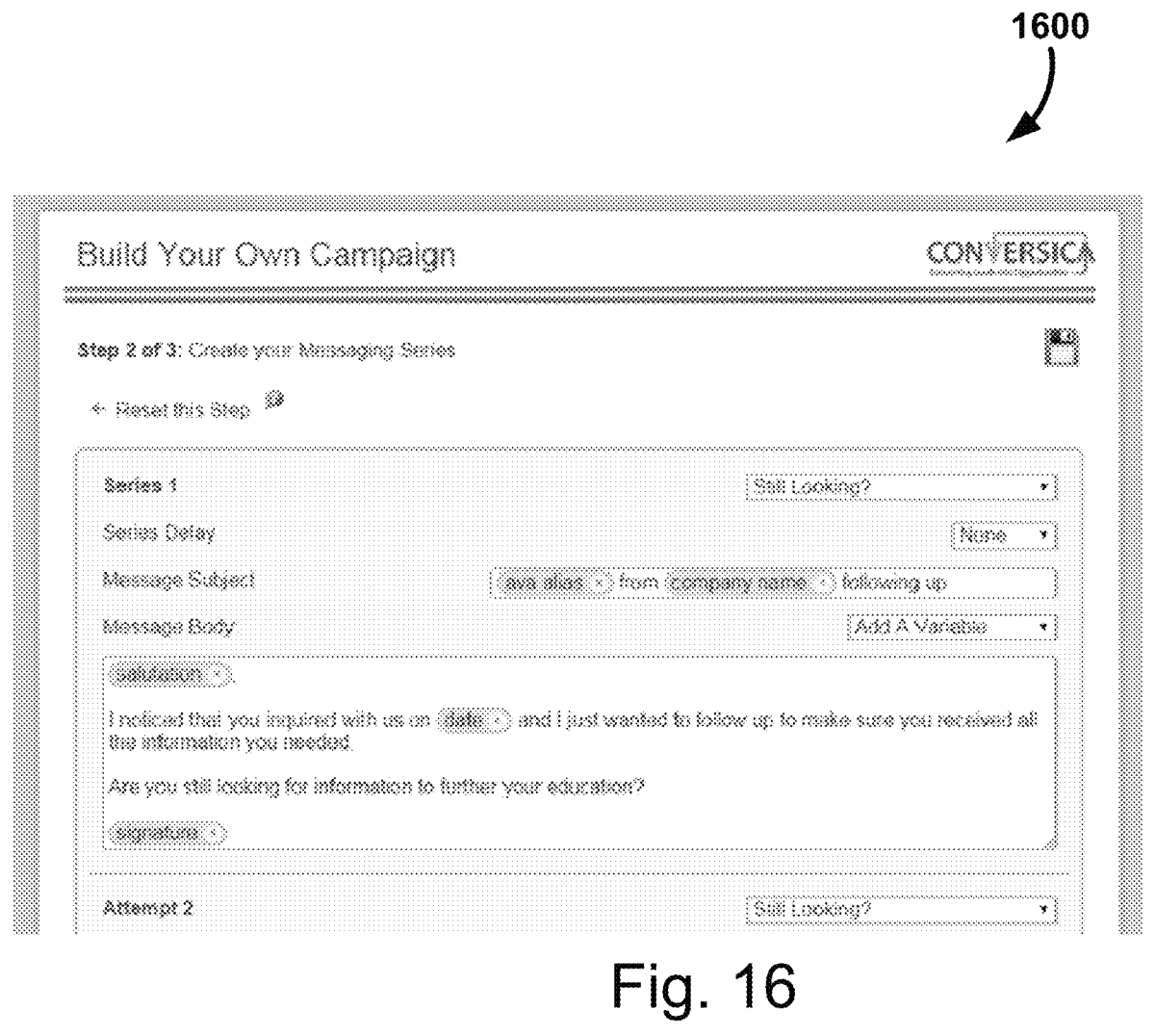

Next, the message series is provided to the user, as shown at FIG. 16 at 1600. Here the series may be selected from a set of pull down options. The series typically includes a short question in order to help direct the response. Each series is typically directed toward meeting an objective for the lead. An example of series and objectives are provided in the below example table:

| Series | Objective |
| --- | --- |
| 1 | Verify Email Address |
| 2 | Obtain Phone Number |
| 2 | Introduce Sales Representative |
| 3 | Verify Rep Follow-Up |

Delay for the series may be input, as well as message subject, and message body. Where appropriate, the user is able to incorporate in variables into the message. These variables may be defined by the user, and may be auto-populated by the system using the lead data. To build a message, possible phrases are gathered for each template component in a template iteration. A single phrase can be chosen randomly from possible phrases for each template component. Chosen phrases are then imported to obtain an outbound message. Logic can be universal or data specific as desired for individual message components.

Each series may include a number of message templates corresponding to multiple attempts to meet the objective. Thus, for example, it the lead fails to respond to the initial message, a different subsequent message may be sent that seeks to answer the objective.

Variable replacement can occur on a per phrase basis, or after a message is composed. Post message-building validation may be integrated into a message-building class. All rules interaction may be maintained with the messaging rule engine.

Figure 17:
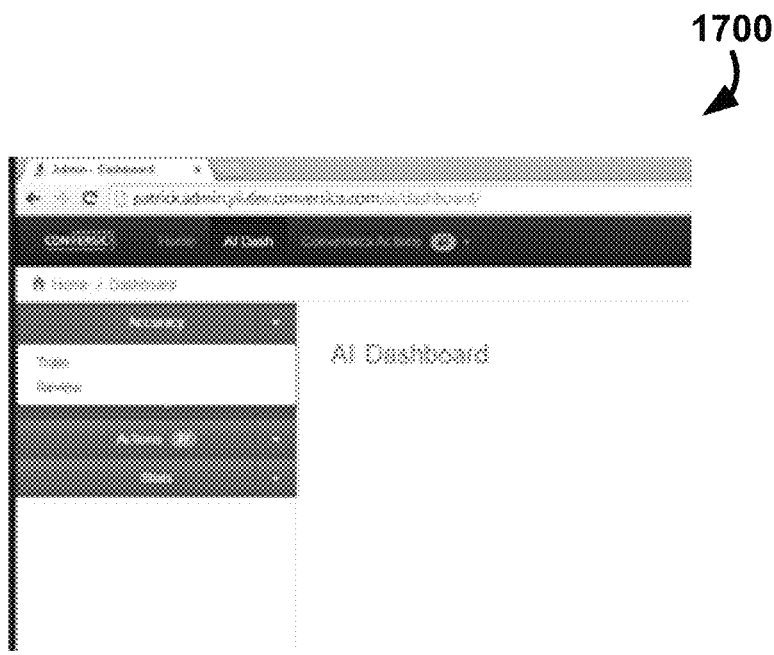
FIGS. 17-24 are example screenshots of AI training interfaces of an administrative dashboard, in accordance with some embodiment.

Now that the campaign building has been explored in considerable detail, attention will be turned to the administrative tools made available to the user. This enables AI management, knowledge set management, insight management, and review of campaign statistics. FIG. 17 provides the top level dashboard for the AI management, shown generally at 1700. At this top level the user is enabled to select training of the AI or review of the AI document classifications. All the tools are located under tabs, located on the left-hand side of the screen.

Figure 18:
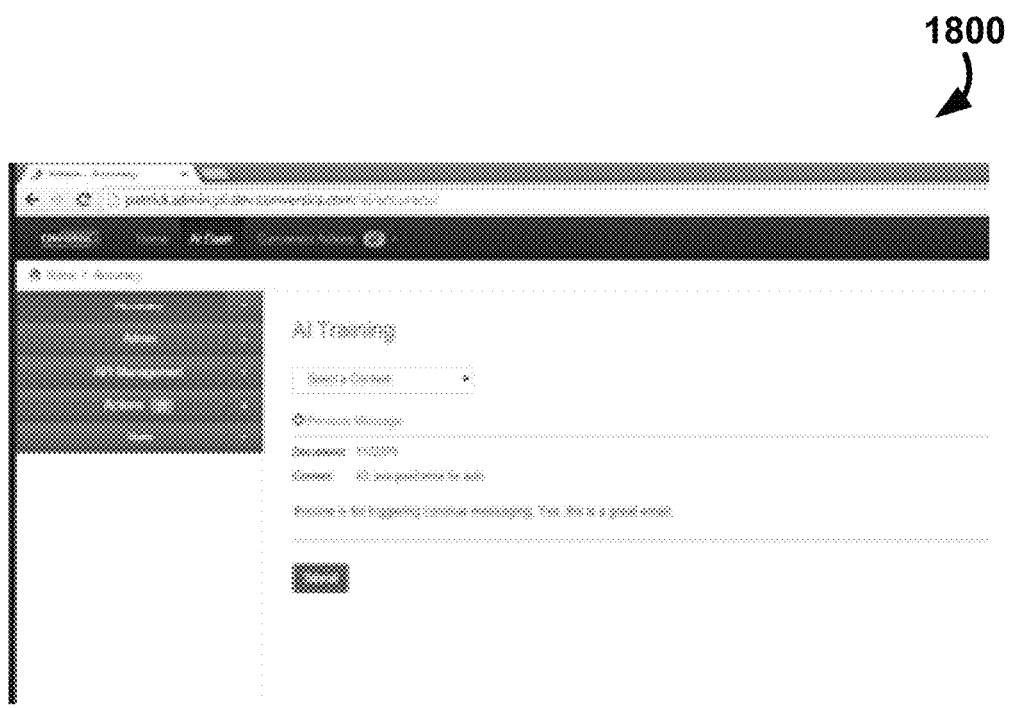

FIG. 18 illustrates the AI training dashboard, shown generally at 1800. The training tool allows AI developers, who may be users or may include messaging server administrators, to train the AI algorithms. This tool is at the center of how the AI is taught new things. The top left of the frame contains the tool title, and below that is a Context dropdown filter, which allows filtering of documents to train by their context. Below that is a previous message button, which redirects back to the previous document that was trained. On the right-side, there is the next message button, moves forward to the next oldest document that could use some training. The determination of which document needs training is determined by how confident the classification for each insight performed by the AI is.

Figure 19:
Figure 20:
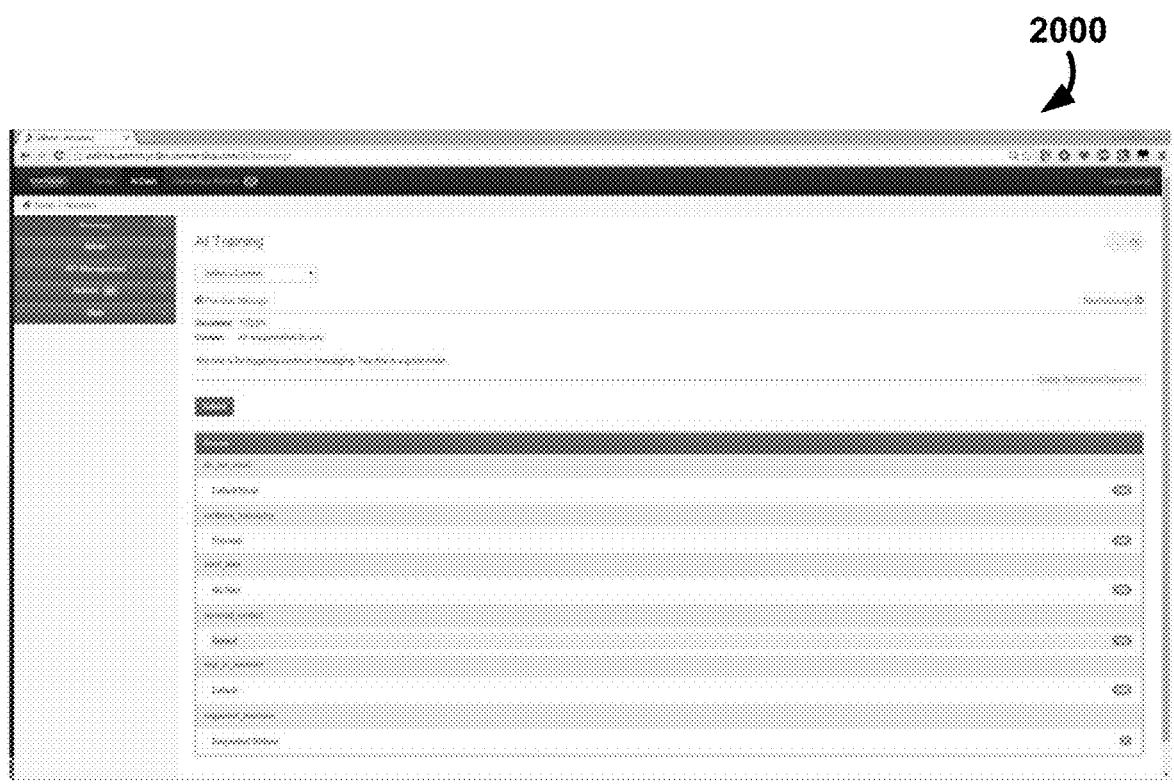

FIG. 19, shown generally at 1900, illustrates the use of a search bar, which allows searching for documents with a given document id, or for a length of text which could exist inside a document body. FIG. 20 illustrates a scores button, which displays the current AI classification for the document, shown generally at 2000. This score is broken up by insight (shaded lines), and the categories selected for those insights. The right side of the categories container has a number which is the confidence value for the category selected. The confidence value is how confident the AI is when choosing that category for that insight. The confidence ranges between 0 and 100 (100 being most confident) in this instant embodiment.

The center of the frame contains the unique document id, the context assigned to the document, and the body of the document. On the right-side of the center frame there is a link called "Display Normalized Document". This will show what the AI does to the document in terms of cleaning, parsing, and other pre-processing techniques before it actually begins scoring.

Figure 21:
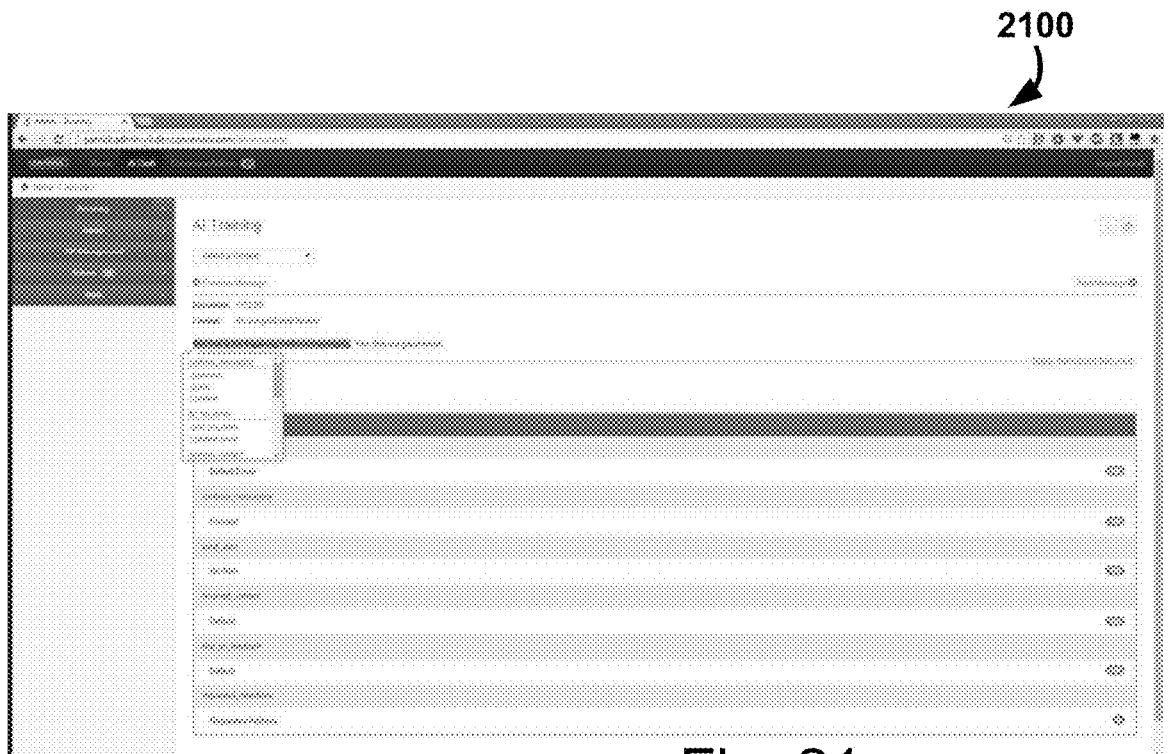
Figure 22:
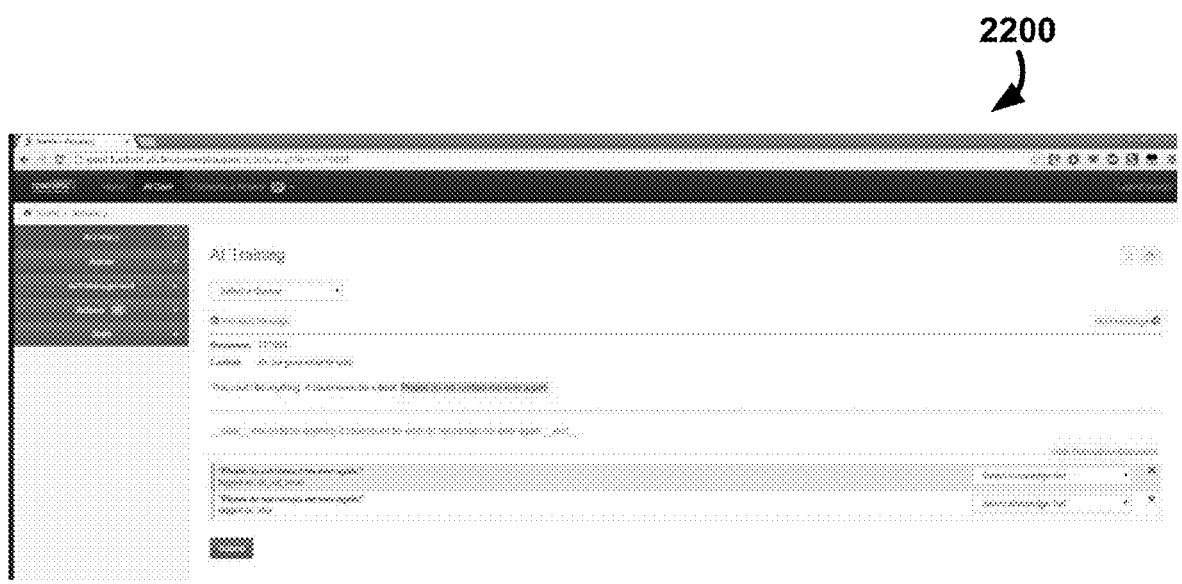

By highlighting a portion of the document body a category selection box will be displayed, as seen at 2100 of FIG. 21. The category selection box enables categorization of highlighted text manually. After selecting categories, the phrases and categories selected appear below the document, as seen at 2200 of FIG. 22. On the right of these new containers is a knowledge set dropdown. In order to train the AI the AI developer selects a knowledge set that is stored in the new training. This links a knowledge set not previously utilized by the AI for the generation of context to the document.

Figure 23:
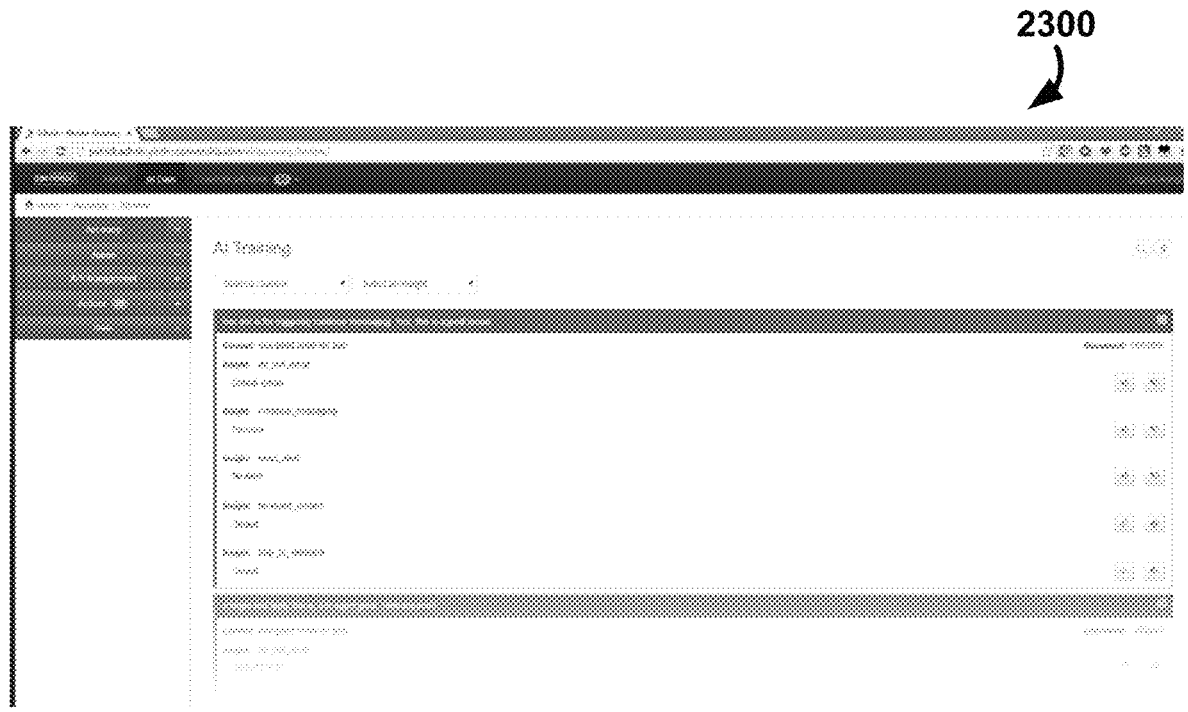

Moving on, FIG. 23 provides a dashboard for the review of AI training, shown generally at 2300. The review tool is used for reviewing documents that the AI has been confident on one or more of the classification determinations. Both context and insight may be filtered for when reviewing documents by selecting the appropriate dropdown located in the top left of the frame. For each confident category selected for a document, the AI developer may select whether the AI's classification is approved by pressing either the "thumbs up" (for agreeing with the AI's classification) or "thumbs down" (for disagreeing with the AI's classification) button.

Figure 24:
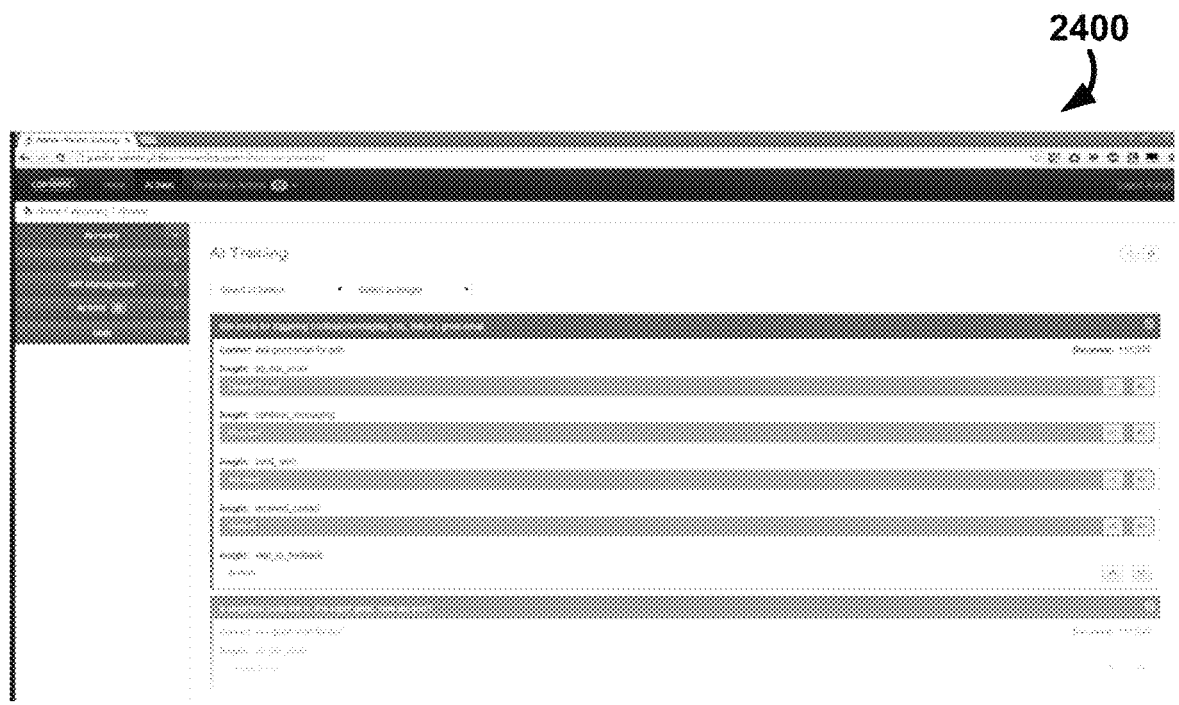

When a category is marked as either correct or incorrect, it will highlight that category row, as shown at 2400 of FIG. 24. When all confident categories in a document are marked, the document will be removed from the display and the next document may be loaded. Following that there is a submit button, which allows the AI developer to submit any training that has been selected.

Figure 25:
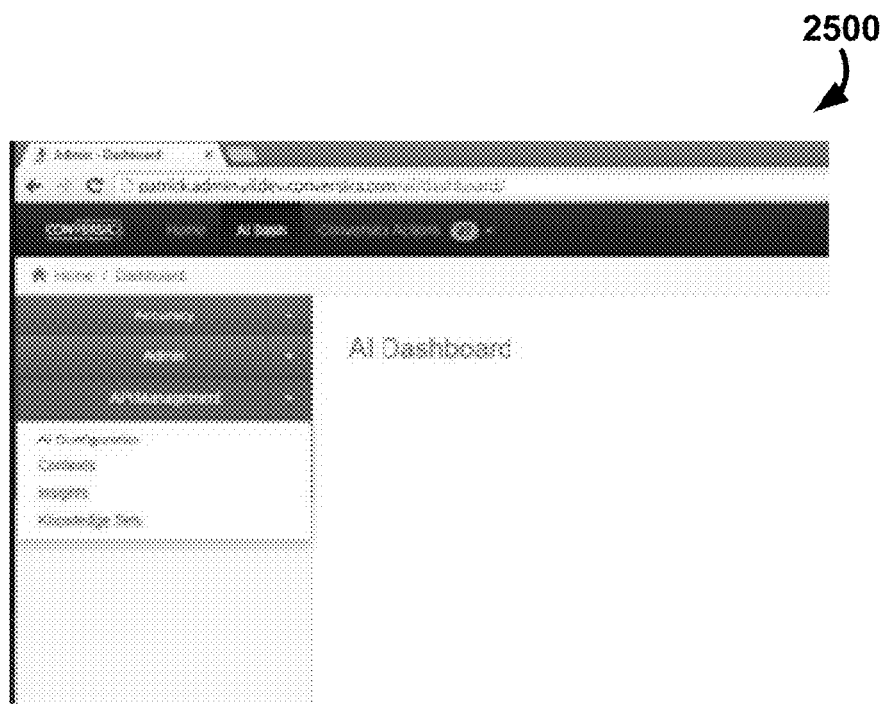
FIGS. 25-29 are example screenshots of context management interfaces of an administrative dashboard, in accordance with some embodiment.
Figure 26:
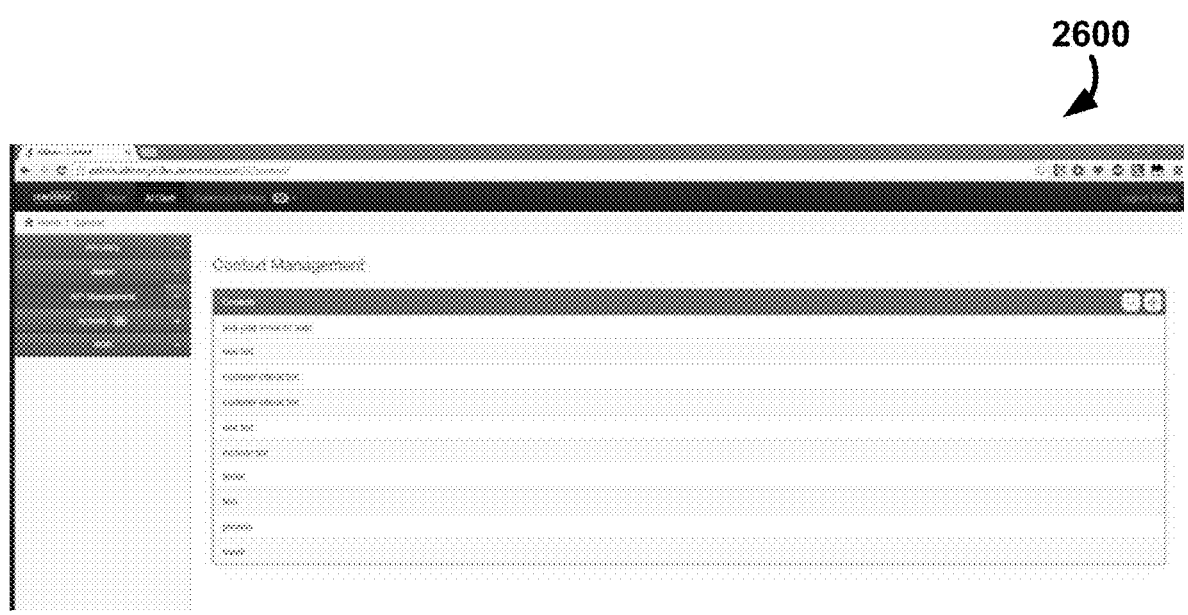
Figure 27:
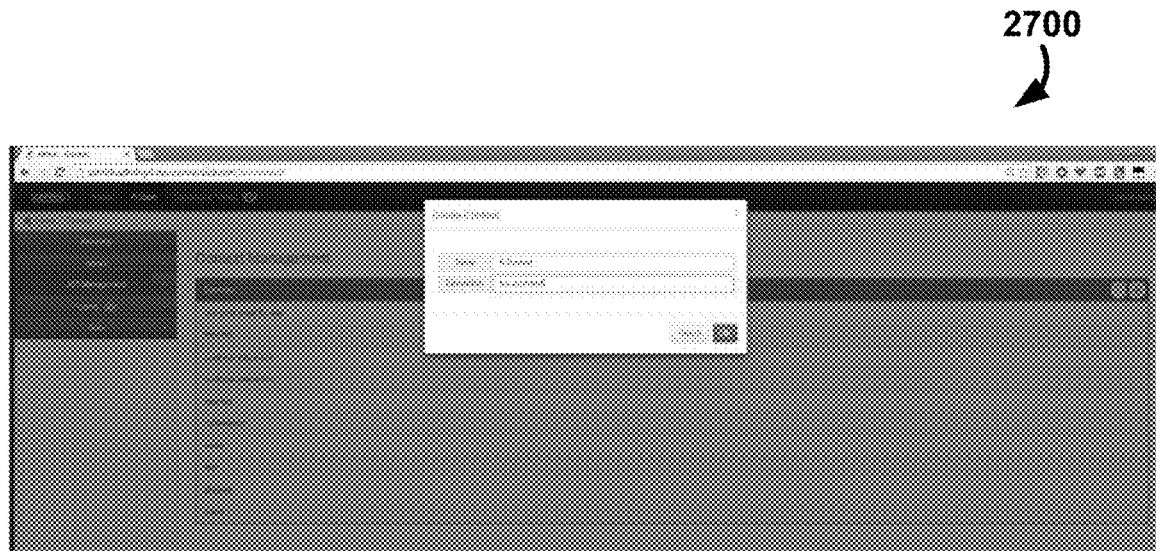

Moving on to FIG. 25, the API Management tab contains tools which deal with the creation and management of objects, shown generally at 2500. The contexts tool, shown at 2600 of FIG. 26, helps in the management of contexts. A list of existing contexts may be displayed on initial load of the system to new AI developers/users. As with AI training, the contexts are searchable using the search bar located in the top right portion of the screen. By pressing the "+" button in the top right-hand corner or the frame, a create dialogue box is launched, as seen at 2700 of FIG. 27. This allows the creation of a new context.

Figure 28:
Figure 29:

FIG. 28 provides the details of a context, shown generally at 2800. The details display for any given context may be viewed by selecting any one of the contexts. The details display contains all the pertinent information about the context and an edit button (wrench icon) located in the top right of the details display. When the edit button is selected an edit dialogue box is launched, as seen at 2900 of FIG. 29. The edit dialogue box enables editing of the information about a context.

Figure 30:
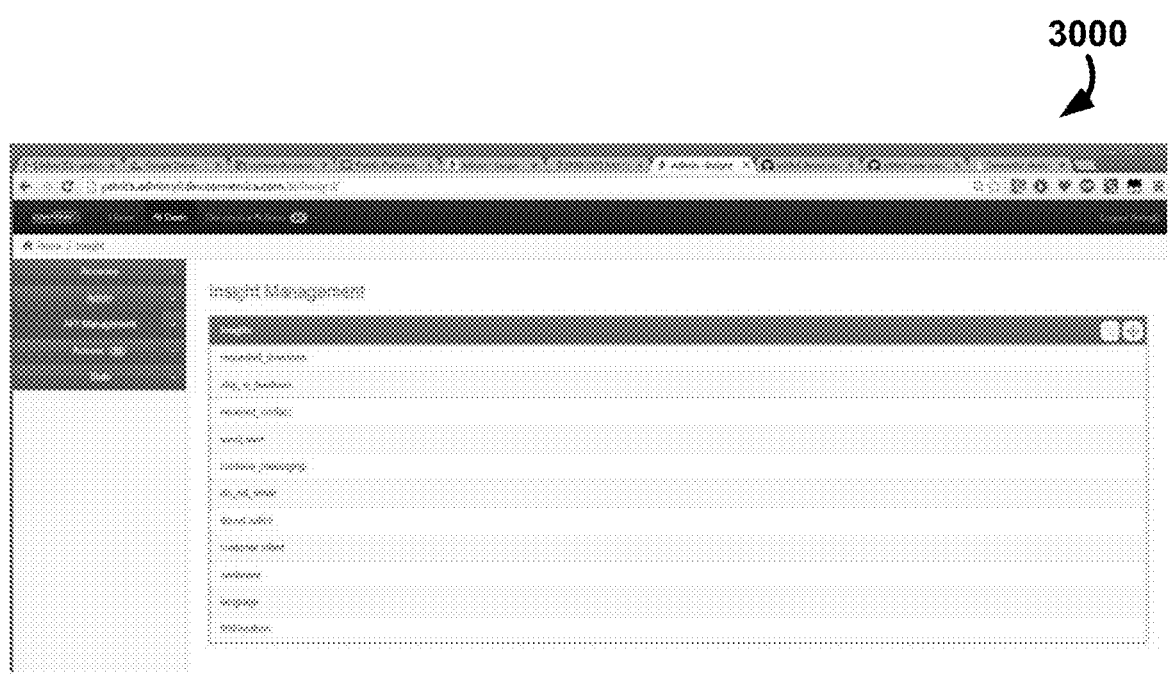
FIGS. 30-33 are example screenshots of insight management interfaces of an administrative dashboard, in accordance with some embodiment.

Moving to FIG. 30, an insight management screenshot is provided, shown generally at 3000. The insights tool helps in the management of insights. As with contexts, a list of existing insights may be displayed on initial load. Likewise, insights may be searched using the search bar located in the top right of the frame.

Figure 31:
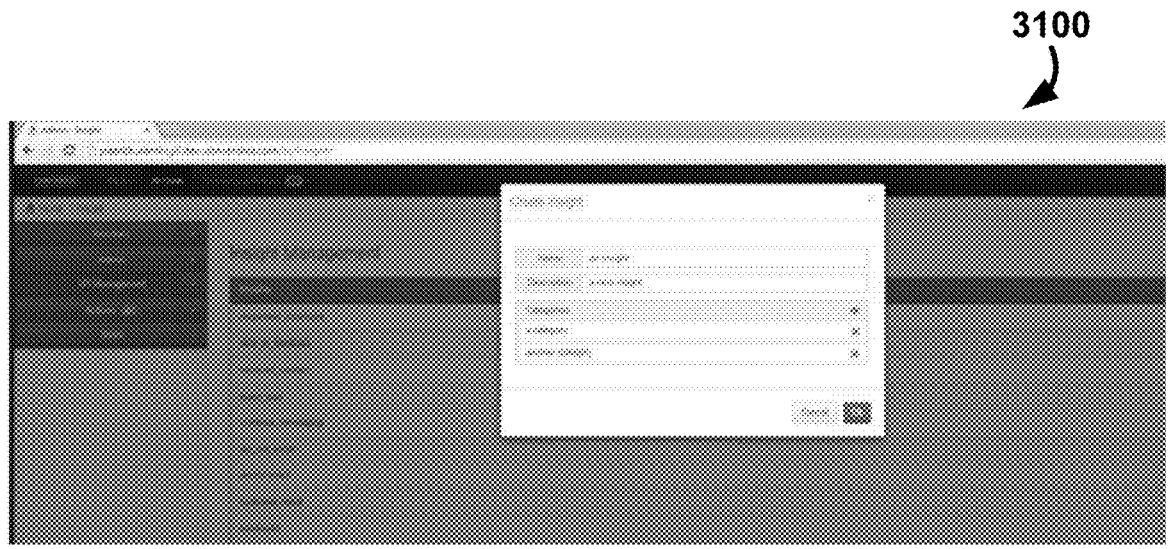
Figure 32:
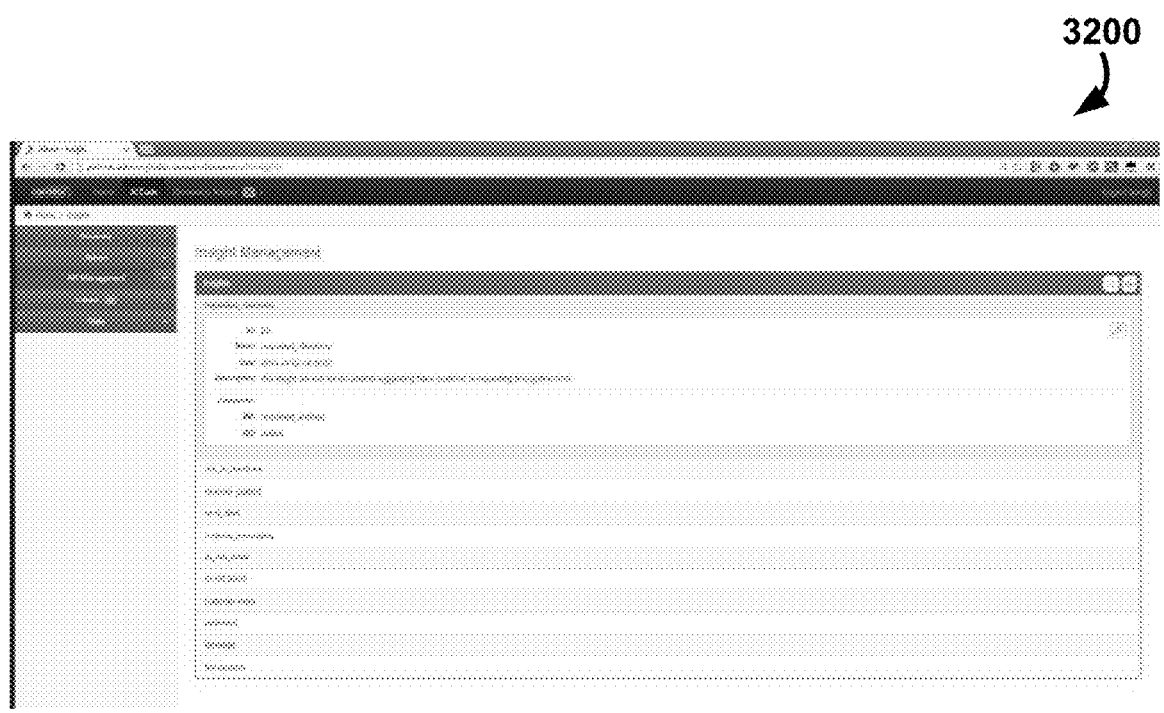
Figure 33:
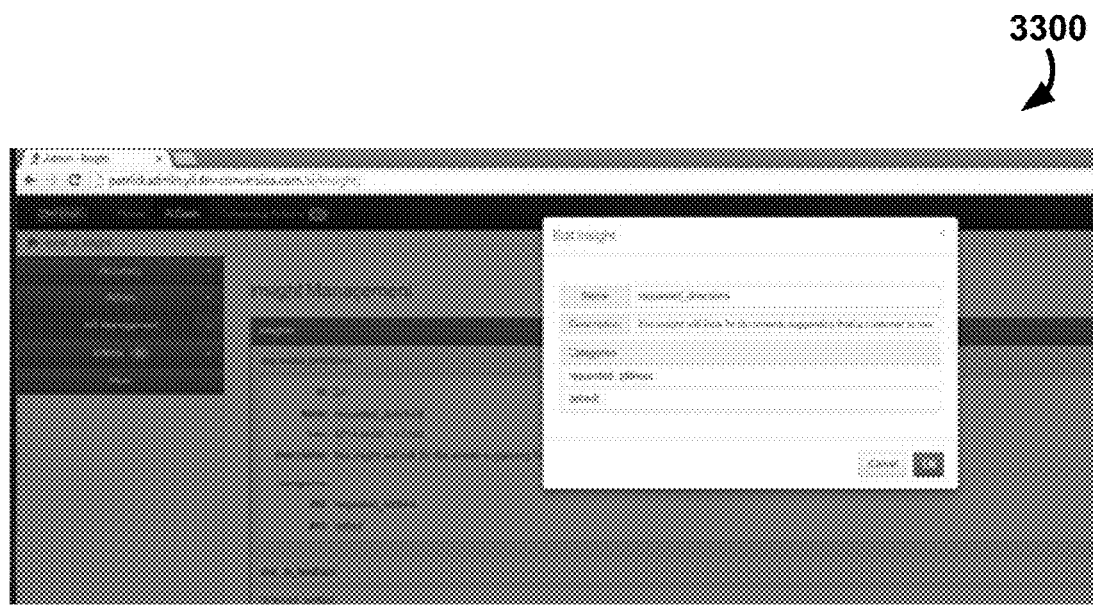

An insight creation dialog box, as seen at 3100 of FIG. 31, may be accessed by pressing the "+" button in the top right-hand corner or the frame. Creating an insight will also require the creation of categories that go with that insight. By selecting any one of the insights, it will pull open a details display for that insight, as seen at 3200 of FIG. 32. The details display contains all the pertinent information about the insight, and includes an edit button (wrench icon) located in the top right of the frame. In some embodiments, each insight has at least two categories. Clicking the edit button will bring up an edit dialogue, as seen at 3300 of FIG. 33, which allows editing of the information for the insight.

Figure 34:
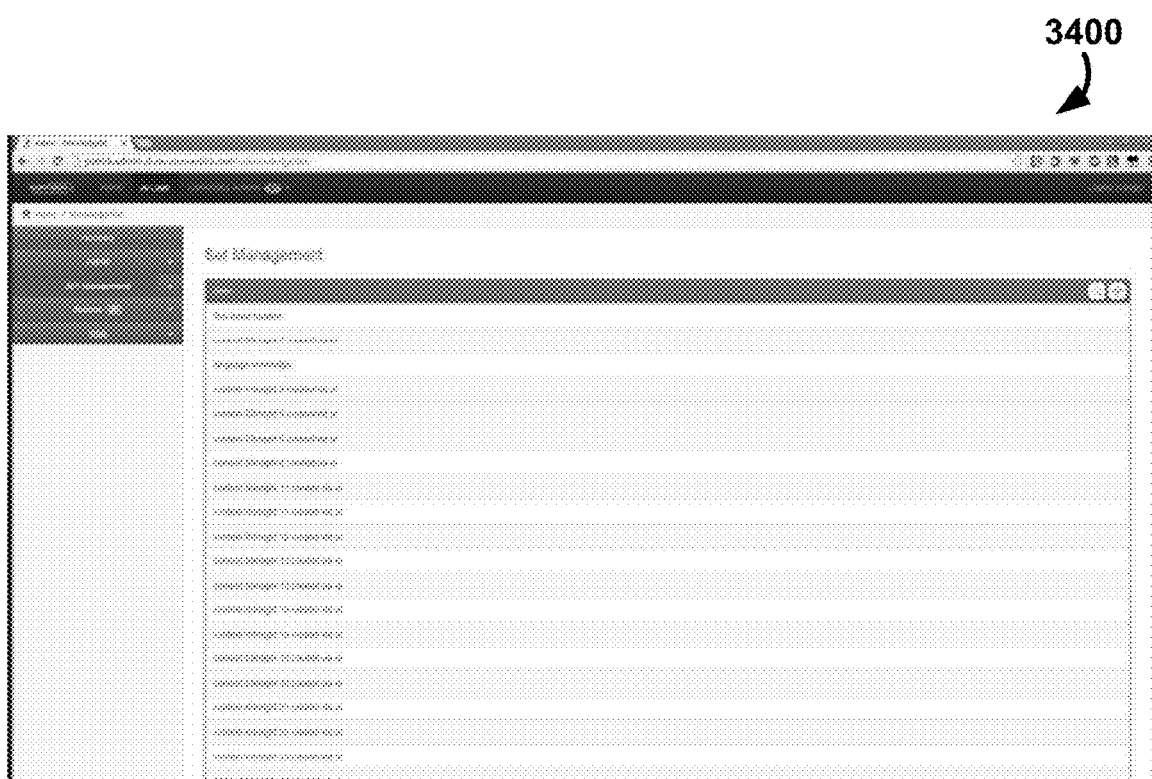
FIGS. 34-37 are example screenshots of knowledge set management interfaces of an administrative dashboard, in accordance with some embodiment.
Figure 35:
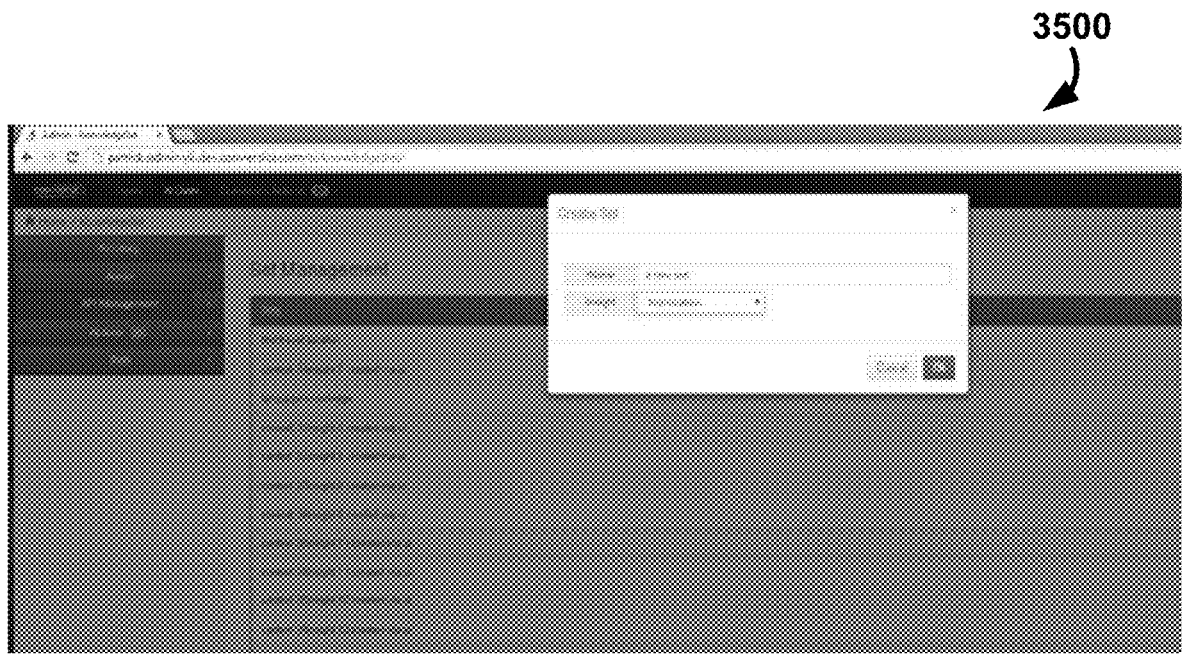

Moving to FIG. 34, an interface for knowledge set management is provided, shown generally at 3400. As with contexts and insights, a list of existing knowledge sets will be displayed on initial load. Likewise, knowledge sets may be searched using the search bar located in the top right of the frame. A knowledge set creation dialog box may be launched, as seen at 3500 of FIG. 35 by pressing the "+" button in the top right-hand corner or the frame. This will allow the creation of a new knowledge set. In some embodiments, a knowledge set requires that an insight exists such that the newly created knowledge set may be bound to that insight.

Figure 36:
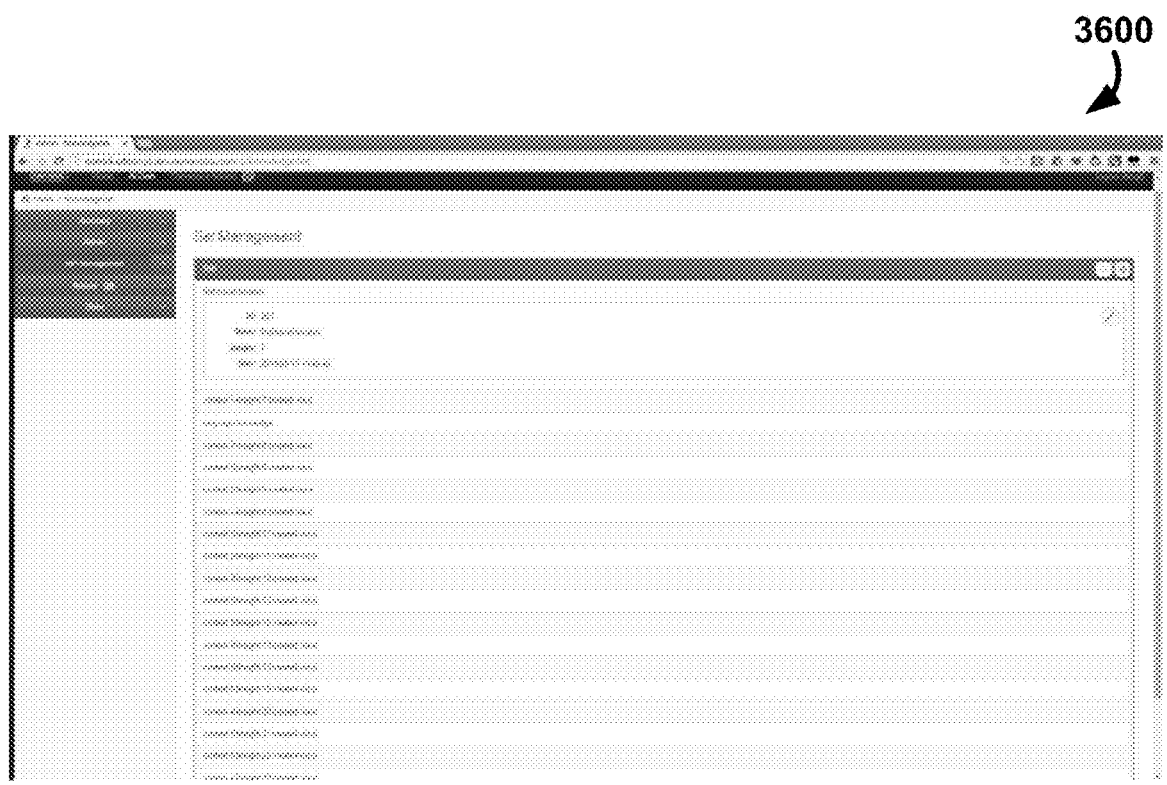
Figure 37:
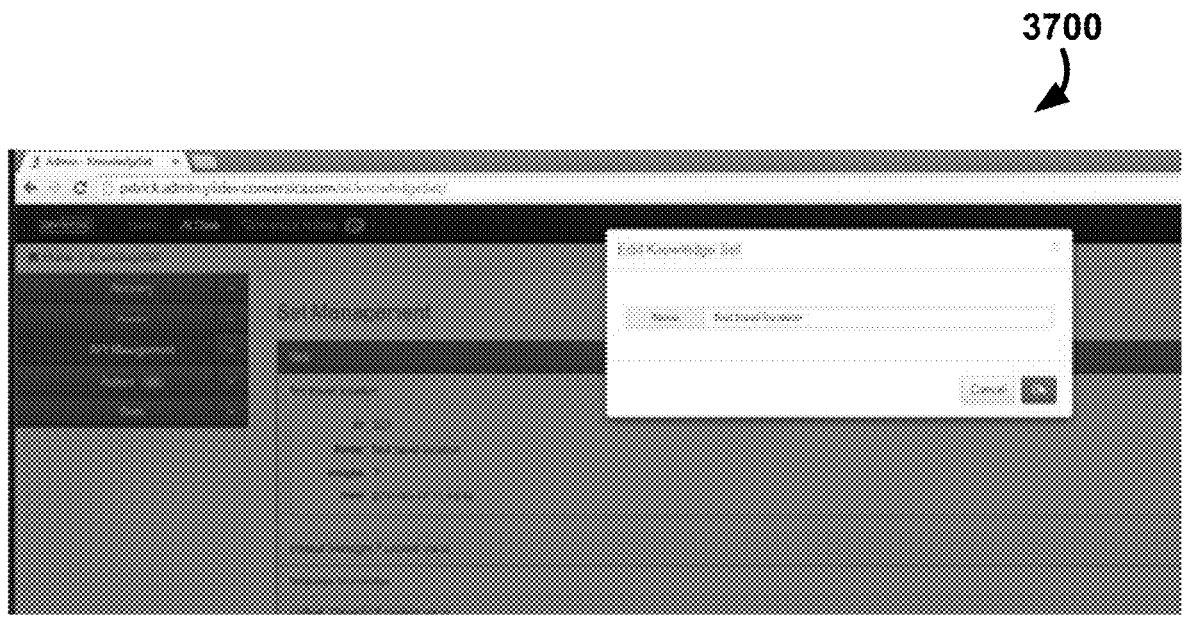

By selecting any one of the insights, it will pull open a details display for that knowledge set, as seen at 3600 of FIG. 36. The details display contains all the pertinent information about the knowledge set and an edit button (wrench icon) located in the top right of the details display. Clicking the edit button brings up an edit dialogue, as seen at 3700 of FIG. 37, which allows the editing of information about a knowledge set.

Figure 38:
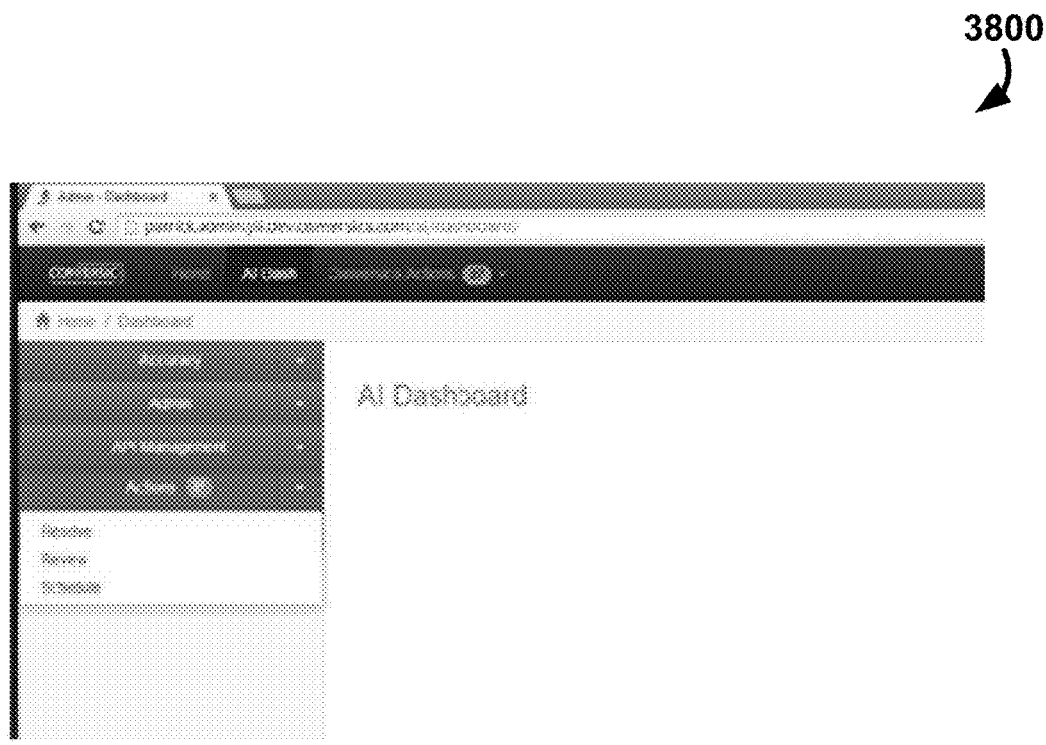
FIGS. 38-41 are example screenshots of action management interfaces of an administrative dashboard, in accordance with some embodiment.
Figure 39:
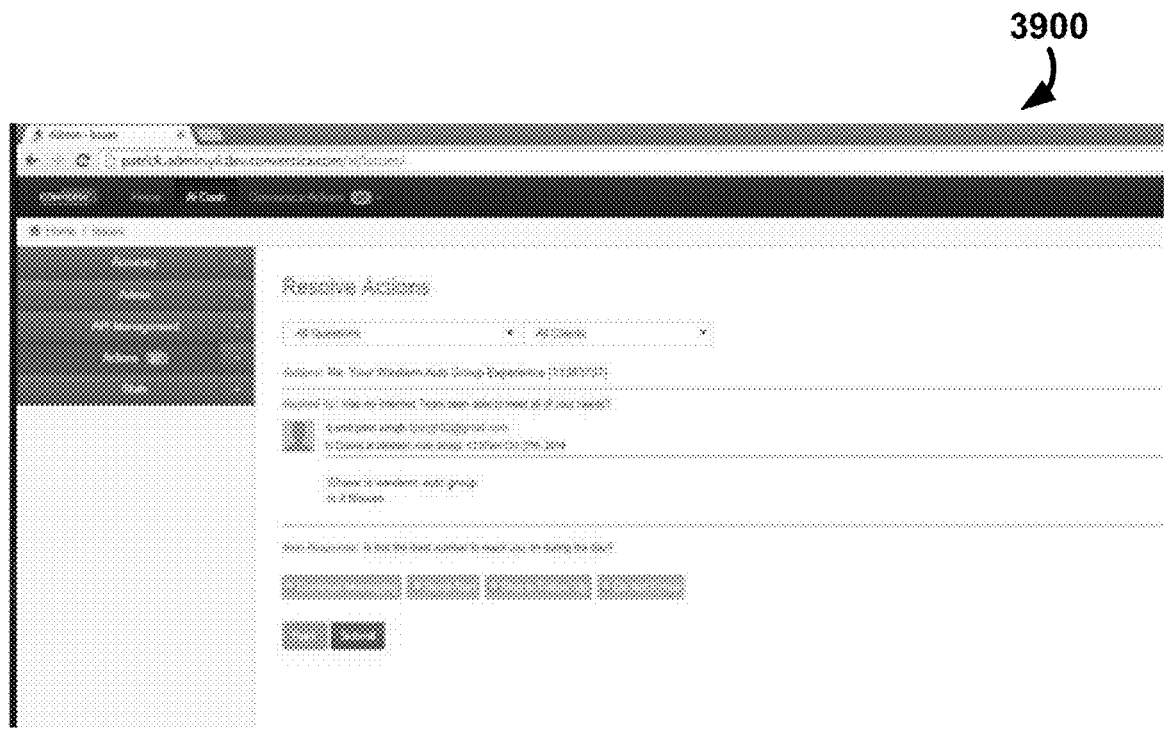

Moving to FIG. 38, an actions management dashboard is illustrated, seen generally at 3800. One of the tools under the action dashboard is the resolve tool, which is seen expanded at 3900 at FIG. 39. The resolve tool allows manual intervention into any pending responses that were considered 'not confident' by the AI classification. This confident/not confident determination is based not only on the confidence scores returned from the AI, but may also include additional factors (for example, the client might be new, the campaign might be new, might be for a new industry, etc.). Manual intervention for a non-confident determination allows the user, system administrator, AI developers, or other suitable individual, to access the document and input an action appropriate for the lead's response. Depending upon the embodiment, this manual intervention does not train the AI directly. The system keeps track of what actions were taken on each response, and this collected data may later be used for analytics for improvements to the AI.

Figure 40:
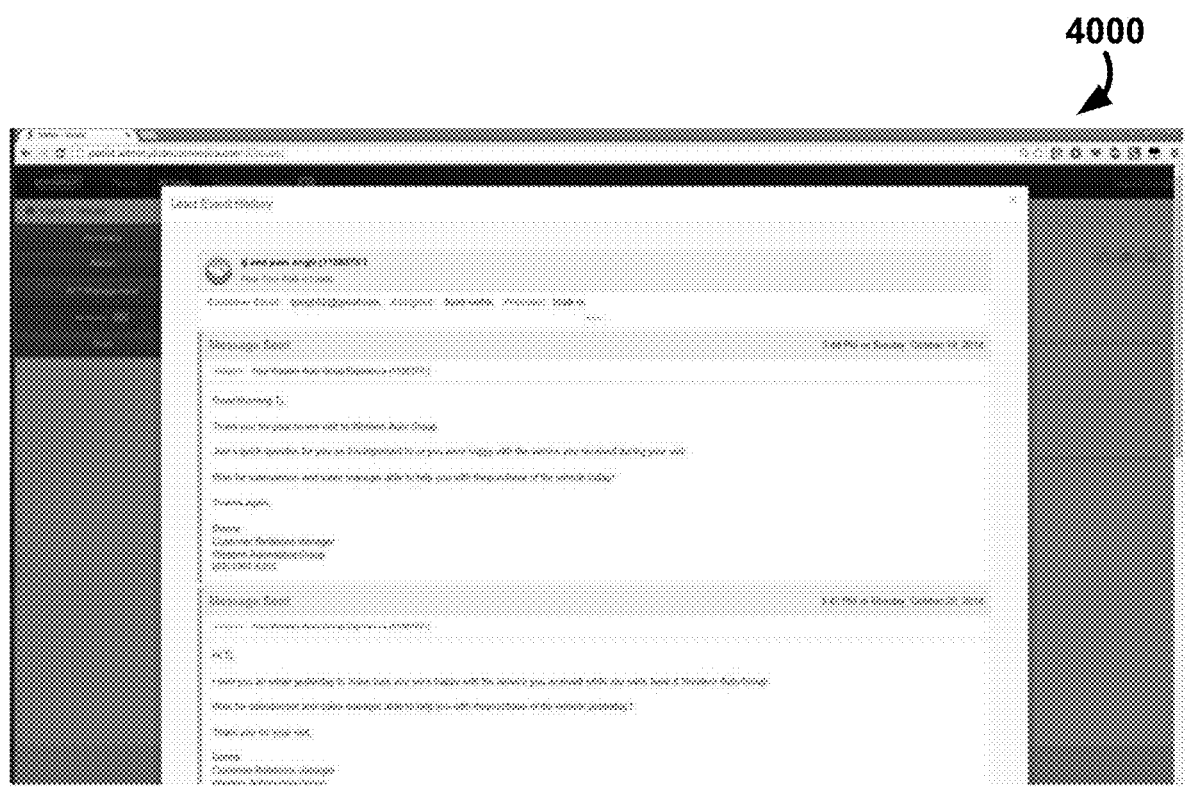

FIG. 40, shown generally at 4000, provides a lead history from the time the lead was input into the system up until the lead's campaign has been completed. This history provides a listing of all the messages sent to the given lead.

Figure 41:

Moving to FIG. 41, the actions taken for a given campaign may be reviewed, seen generally at 4100. The action review tool is laid out almost identically to the above action resolve tool. However, the action review tool does two things; 1) allows responses to be reviewed for actions that were considered confident and did not require manual review, and 2) review responses that were manually resolved by another user. This tool may be utilized to collect accuracy data on other users by the more senior users (such as AI developers), and allows users to check the accuracy of automatic actions being performed by the system.

Figure 42:
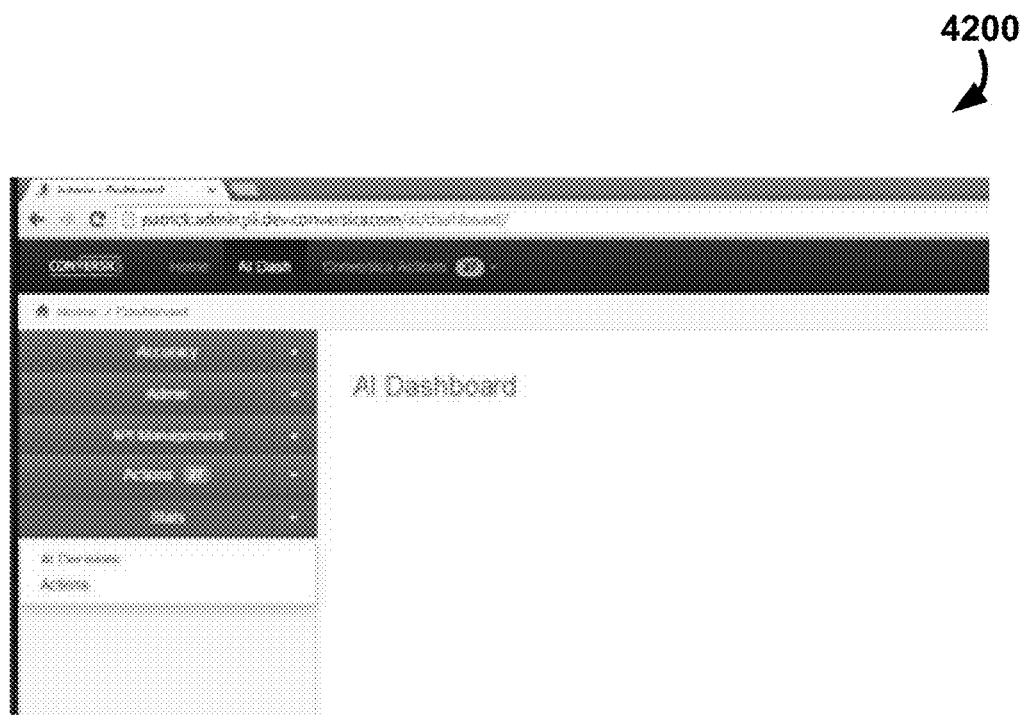
FIGS. 42-45 are example screenshots of statistics interfaces of an administrative dashboard, in accordance with some embodiment.
Figure 43:

Moving to FIG. 42, the statistics dashboard is illustrated, shown generally at 4200. The statistics tab contains some analytics and reporting tools. This tools collect data from resolve actions, review actions, and review accuracy tools. The AI decisions tool reports on a few AI specific statistics, as seen at 4300 of FIG. 43. In this specific example illustration, each graph is over a seven day window. The first shows how accurate the system is on a context by context basis. The next shows something similar based on insight. The final grouping of statistics shows how many responses need to be manually resolved by a user.

Figure 44:
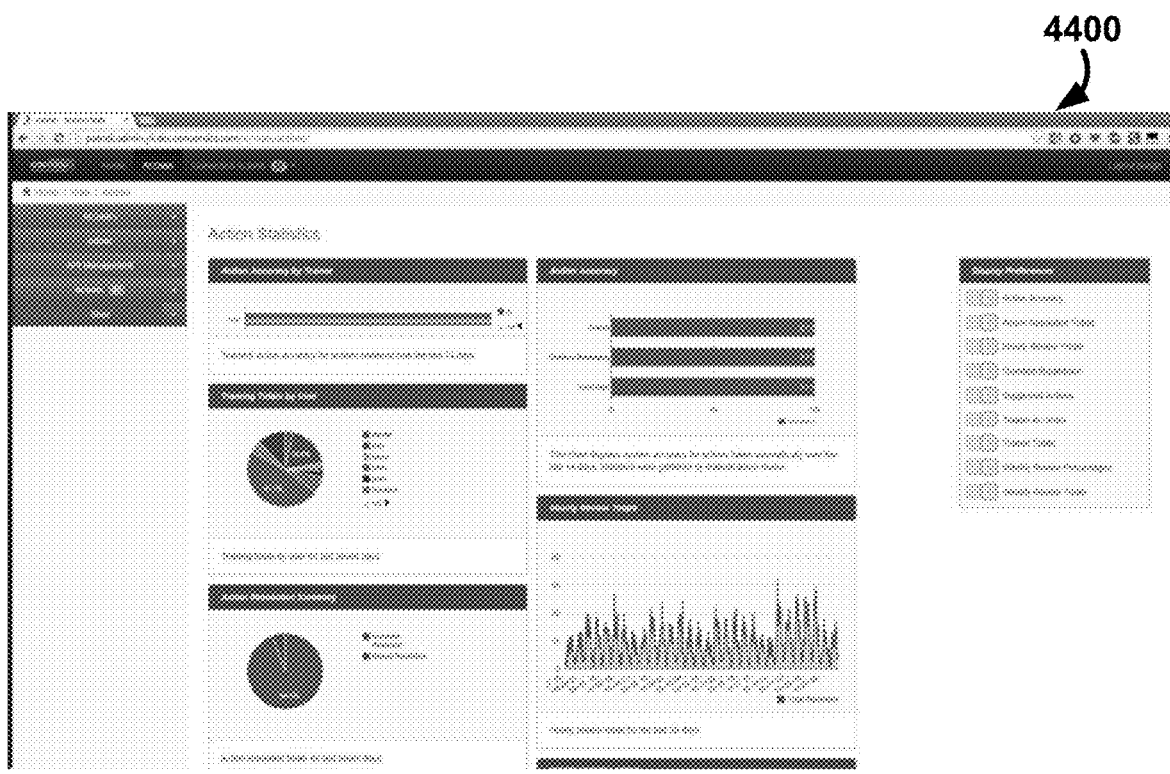
Figure 45:
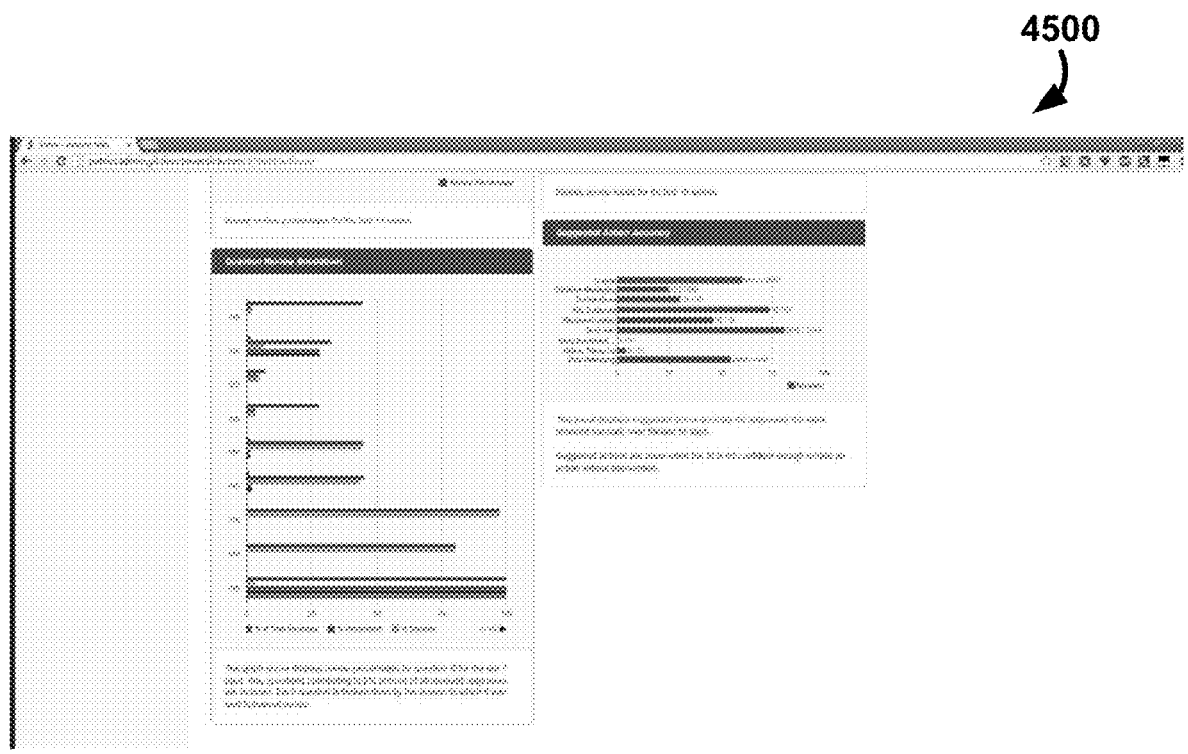

Lastly, FIGS. 44 and 45 show action statistics, shown generally at 4400 and 4500, respectively. Each box includes statistics regarding actions taken, and include, for example, training by users, action accuracy, action resolution summaries, suggested action accuracy, and the like.

V. SYSTEM EMBODIMENTS

Figure 46A:
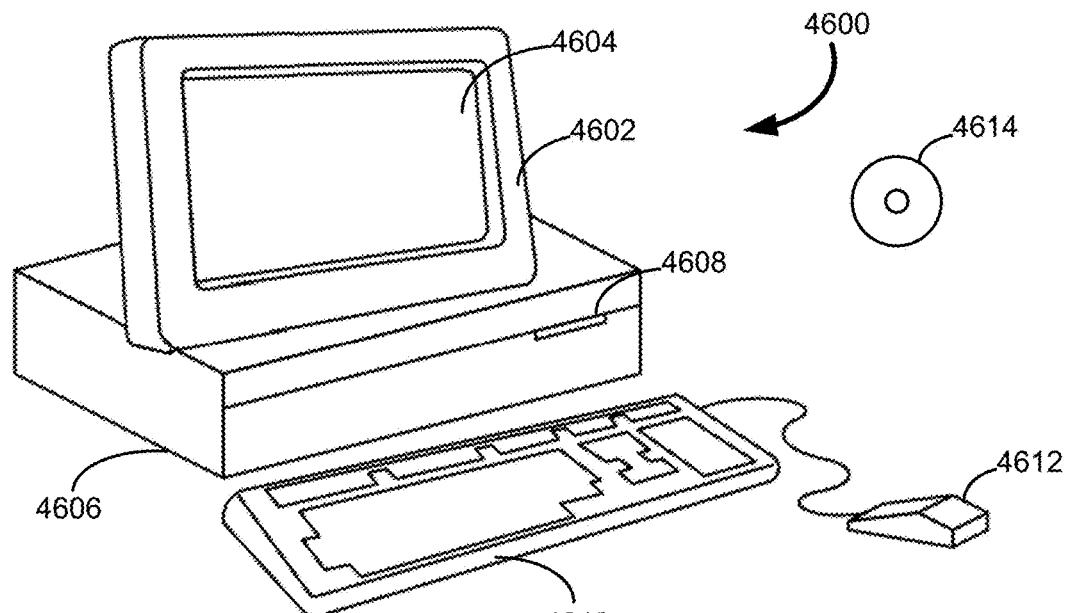
FIGS. 46A and 46B are example illustrations of a computer system capable of embodying the current invention.
Figure 46B:
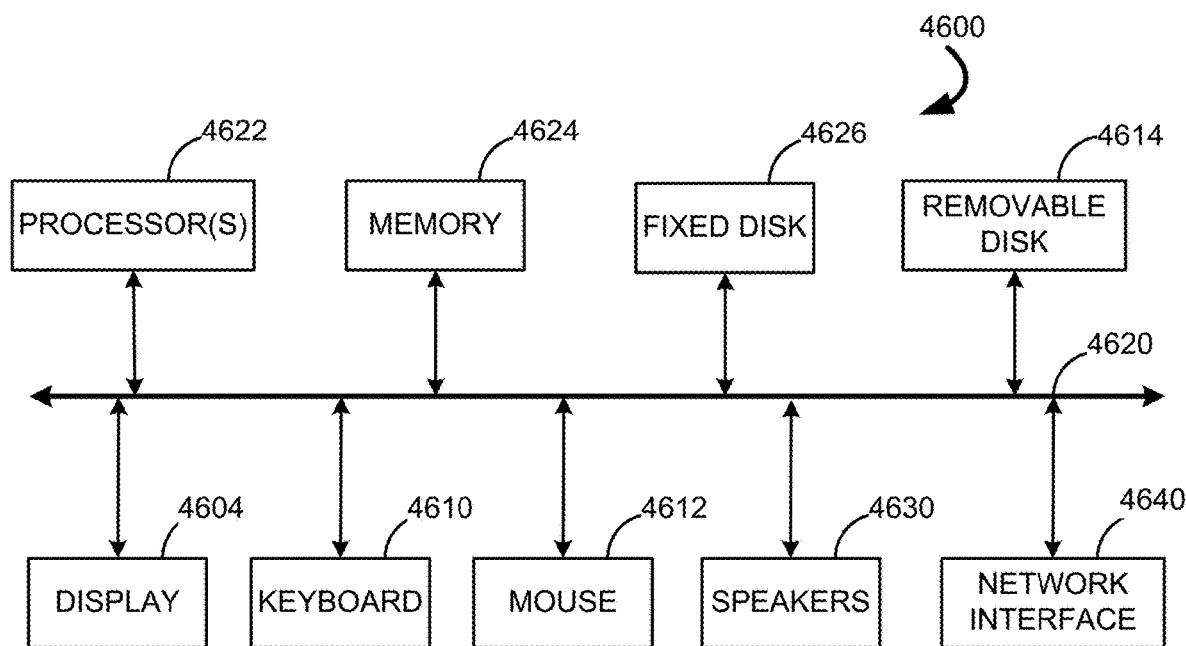

FIGS. 46A and 46B illustrate a Computer System 4600, which is suitable for implementing embodiments of the present invention. FIG. 46A shows one possible physical form of the Computer System 4600. Of course, the Computer System 4600 may have many physical forms ranging from a printed circuit board, an integrated circuit, or a small handheld device up to a huge super computer. Computer system 4600 may include a Monitor 4602, a Display 4604, a Housing 4606, a Disk Drive 4608, a Keyboard 4610, and a Mouse 4612. Disk 4614 is a computer-readable medium used to transfer data to and from Computer System 4600.

FIG. 46B is an example of a block diagram for Computer System 4600. Attached to System Bus 4620 are a wide variety of subsystems. Processor(s) 4622 (also referred to as central processing units, or CPUs) are coupled to storage devices, including Memory 4624. Memory 4624 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable form of the computer-readable media described below. A Fixed Disk 4626 may also be coupled bi-directionally to the Processor 4622; it provides additional data storage capacity and may also include any of the computer-readable media described below. Fixed Disk 4626 may be used to store programs, data, and the like and is typically a secondary storage medium (such as a hard disk) that is slower than primary storage. It will be appreciated that the information retained within Fixed Disk 4626 may, in appropriate cases, be incorporated in standard fashion as virtual memory in Memory 4624. Removable Disk 4614 may take the form of any of the computer-readable media described below.

Processor 4622 is also coupled to a variety of input/output devices, such as Display 4604, Keyboard 4610, Mouse 4612 and Speakers 4630. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, motion sensors, brain wave readers, or other computers. Processor 4622 optionally may be coupled to another computer or telecommunications network using Network Interface 4640. With such a Network Interface 4640, it is contemplated that the Processor 4622 might receive information from the network, or might output information to the network in the course of performing the above-described dynamic messaging. Furthermore, method embodiments of the present invention may execute solely upon Processor 4622 or may execute over a network such as the Internet in conjunction with a remote CPU that shares a portion of the processing.

In sum, the present invention provides a system and methods for dynamic automated messaging driven by an artificial intelligence. The advantages of such a system include the ability to provide seemingly human driven email interactions without the required manual input. Such systems may be particularly helpful in the context of sales and marketing, but may likewise be utilized wherever large distributions of email are being employed.

While this invention has been described in terms of several embodiments, there are alterations, modifications, permutations, and substitute equivalents, which fall within the scope of this invention. Although sub-section titles have been provided to aid in the description of the invention, these titles are merely illustrative and are not intended to limit the scope of the present invention.

It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. A method for managing an automated messaging campaign comprising:
   populating, by a server, a data store with at least one knowledge set and at least one lead dataset in response to a user's input;
   providing, by the server, a campaign builder to the user, wherein the campaign builder includes a set of series of message templates with variable fields, and further wherein the variable fields correspond to classes of data from at least one of the at least one knowledge set and the at least one lead dataset, and wherein each series is associated with a unique objective to collect specific data from the lead;
   receiving input from at least one device of the user to initiate a campaign via the campaign builder;
   administering, by the server over a network, the campaign to leads identified in the lead dataset by sending a first message in a first series to the leads and receiving responses to the first message;
   categorizing, by the server, the responses using artificial intelligence (AI) natural language processing, where the categorizing includes a confidence level;
   combining, by the server, the response categorization with a rule engine to determine when any objectives to collect a first piece of specific data from the lead have been met;

sending, by the server, a second message in the first series when an objective to collect the first piece of specific data from the lead associated with the first message in the first series is not met;

sending, by the server, a first message in a second series when the objective to collect the first piece of specific data from the lead associated with the first series is met, but an objective to collect a second piece of specific data from the lead associated with the second series is not met;

skipping to a subsequent message in a subsequent series when the objective to collect the first piece of specific data from the lead associated with the first series and the objective to collect the second piece of specific data from the lead associated with the second series are met, but an objective to collect a third piece of specific data from the lead associated with the subsequent message is not met;

transmitting, by the server, the subsequent message to the lead responsive to the skipping step; and deactivating the lead when all of the unique objectives to collect specific data from the lead have been met.

2. The method of claim 1, wherein the campaign comprises a series of messages automatically generated by populating the variable fields within the message templates with appropriate data from at least one of the at least one knowledge set and the at least one lead dataset.

3. The method of claim 2, wherein the response is a message sent from a lead in response to a message generated as part of the campaign.

4. The method of claim 3, further comprising providing the user with an artificial intelligence training tool, wherein the artificial intelligence training tool is used to tune algorithms used to categorize the responses.

5. The method of claim 2, wherein the messages are text.

6. The method of claim 5, wherein the messages are email.

7. The method of claim 4, further comprising providing the user with an insight management tool, and wherein the insight management tool allows the user to review and update insights generated by the algorithms.

8. The method of claim 1, further comprising providing the user with a knowledge base management tool, and wherein the knowledge base management tool allows the user to create and update knowledge sets.

9. The method of claim 1, further comprising providing the user with an action interface for resolving actions when a next action in the campaign is unclear due to at least one of the confidence levels below a threshold and the action conflicts with a rule.

10. The method of claim 1, further comprising providing the user with a statistics interface, wherein the statistics interface provides the user information regarding the campaign status.

11. A system for managing an automated messaging campaign comprising:

a data store configured to be populated with at least one knowledge set and at least one lead dataset in response to a user's input;

a campaign builder, embodied on a server, configured to be accessed by the user, wherein the campaign builder includes a series of message templates with variable fields, and further wherein the variable fields correspond to classes of data from at least one of the at least one knowledge set and the at least one lead dataset, wherein the campaign builder is further configured to receive input from the user to initiate a campaign, and wherein each series is associated with a unique objective to collect specific data from the lead;

an artificial intelligence (AI) platform, embodied on the server, for administering the campaign to leads identified in the lead dataset by sending a first message in a first series to the leads and receiving responses to the messages, for categorizing the responses using natural language processing, where the categorizing includes a confidence level, and for combining the response categorization with a rule engine to determine when any objectives to collect a first piece of specific data from the lead have been met; and a campaign manager, embodied on the server, configured send a second message in the first series when an objective to collect a first specific piece of data from the lead associated with the first message in the first series is not met, send a first message in a second series when the objective to collect the first specific piece of data from the lead associated with the first series is met, but an objective to collect a second specific piece of data from the lead associated with the second series is not met, skip to a subsequent message in a subsequent series when the objective to collect the first specific piece of data from the lead associated with the first series and the objective to collect the second specific piece of data from the lead associated with the second series are met, but an objective to collect a third specific piece of data from the lead associated with the subsequent message is not met, transmitting the subsequent message responsive to the skipping, and deactivate the lead when all of the unique objectives to collect specific data from the lead have been met.

12. The system of claim 11, wherein the campaign comprises a series of messages automatically generated by the campaign builder by populating the variable fields within the message templates with appropriate data from at least one of the at least one knowledge set and the at least one lead dataset.

13. The system of claim 12, wherein the response is a message sent from a lead in response to a message generated as part of the campaign.

14. The system of claim 13, further comprising an artificial intelligence training tool configured to tune algorithms used to categorize the responses.

15. The system of claim 12, wherein the messages are text.

16. The system of claim 15, wherein the messages are email.

17. The system of claim 14, further comprising an insight management tool configured to allow the user to review and update insights generated by the algorithms.

18. The system of claim 11, further comprising a knowledge base management tool configured to allow the user to create and update knowledge sets.

19. The system of claim 11, further comprising an action interface for resolving actions when a next action in the campaign is unclear due to at least one of the confidence levels below a threshold and the action conflicts with a rule.

20. The system of claim 11, further comprising a statistics interface configured to provide the user information regarding the campaign status.

* * * * *